(12) United States Patent
Fujinawa

(10) Patent No.: US 6,815,917 B2
(45) Date of Patent: Nov. 9, 2004

(54) AUTOMATIC LATHE, METHOD FOR CONTROLLING THE SAME, AND DEVICE FOR CONTROLLING THE SAME

(75) Inventor: Tadashi Fujinawa, Sakado (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 10/470,140

(22) PCT Filed: Apr. 27, 2001

(86) PCT No.: PCT/JP01/03748

§ 371 (c)(1),
(2), (4) Date: Jul. 25, 2003

(87) PCT Pub. No.: WO02/091089

PCT Pub. Date: Nov. 14, 2002

(65) Prior Publication Data

US 2004/0100218 A1 May 27, 2004

(51) Int. Cl.[7] .............................................. G05B 11/01
(52) U.S. Cl. ................. 318/560; 318/567; 318/568.1; 318/570; 318/578; 318/569; 318/600; 700/159; 700/192; 700/193; 82/19; 82/157; 82/158; 82/118
(58) Field of Search ........................ 318/560, 567, 318/568.1, 570, 578, 569, 600; 700/159, 160, 169, 182, 186, 192, 193; 82/19, 118, 157, 158

(56) References Cited

U.S. PATENT DOCUMENTS 4,413,539 A * 11/1983 Ishizuka et al. ............... 82/120
4,584,915 A * 4/1986 Ichiyanagi et al. ............ 82/19
4,646,596 A * 3/1987 Edwards et al. ............... 82/19
5,127,140 A * 7/1992 Oiwa et al. .................. 29/27 C
5,243,534 A * 9/1993 Takahashi Yoshikatsu .. 700/179
5,436,845 A * 7/1995 Takahashi .................... 700/179
5,704,262 A * 1/1998 Baumbusch et al. .......... 82/124
5,770,936 A * 6/1998 Hirai et al. .................. 318/538
6,010,440 A * 1/2000 Miyano .......................... 483/1

FOREIGN PATENT DOCUMENTS

| JP | 2-074185 | 3/1990 |
| JP | 11-110047 | 4/1999 |
| JP | 11-259135 | 9/1999 |

* cited by examiner

*Primary Examiner*—Rina Duda
(74) *Attorney, Agent, or Firm*—Finnegan, Henderson, Farabow, Garrett & Dunner, L.L.P.

(57) ABSTRACT

A method for controlling an automatically operated lathe provided with at least one spindle and at least one tool rest includes the following steps. First, each of a plurality of transfer position data required in a sequence of machining programs in connection with at least one spindle and at least one tool rest is provided in a form of either one of two types of transfer position data, one of which is cam-reference data directing a transfer position as a function of a cam rotation quantity and the other is time-reference data directing a transfer position as a function of an elapsed time. Next, a time-series allocation of the cam-reference data and the time-reference data is designated in the sequence of machining programs. Then, the cam-reference data and the time-reference data are processed in accordance with the time-series allocation, so as to control a relative feed motion between at least one spindle and at least one tool rest in the sequence of machining programs.

21 Claims, 14 Drawing Sheets

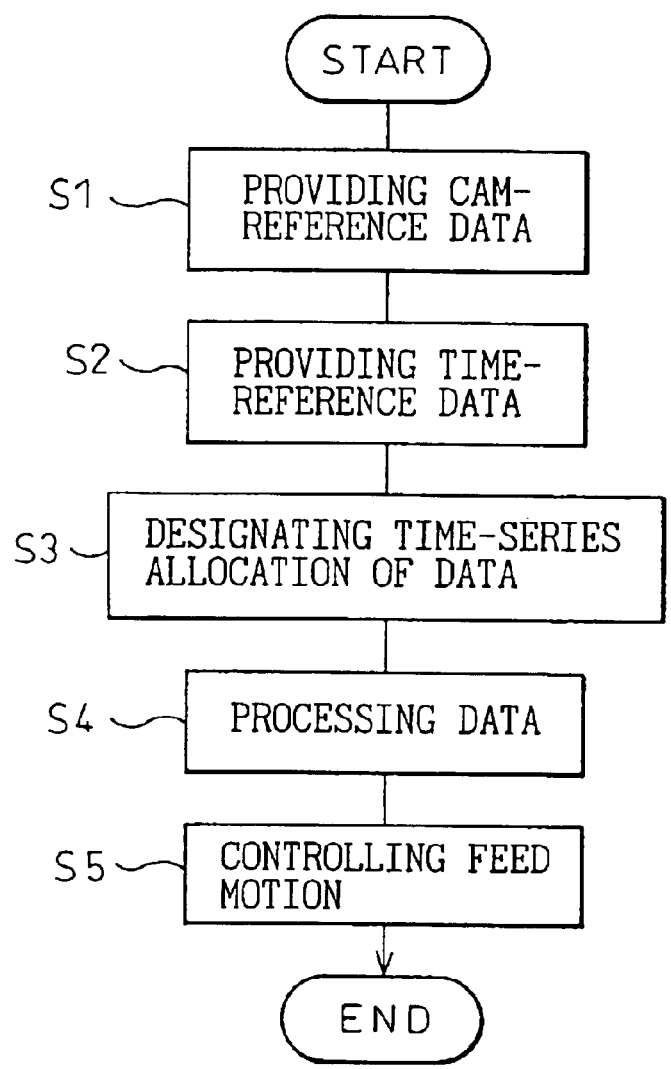

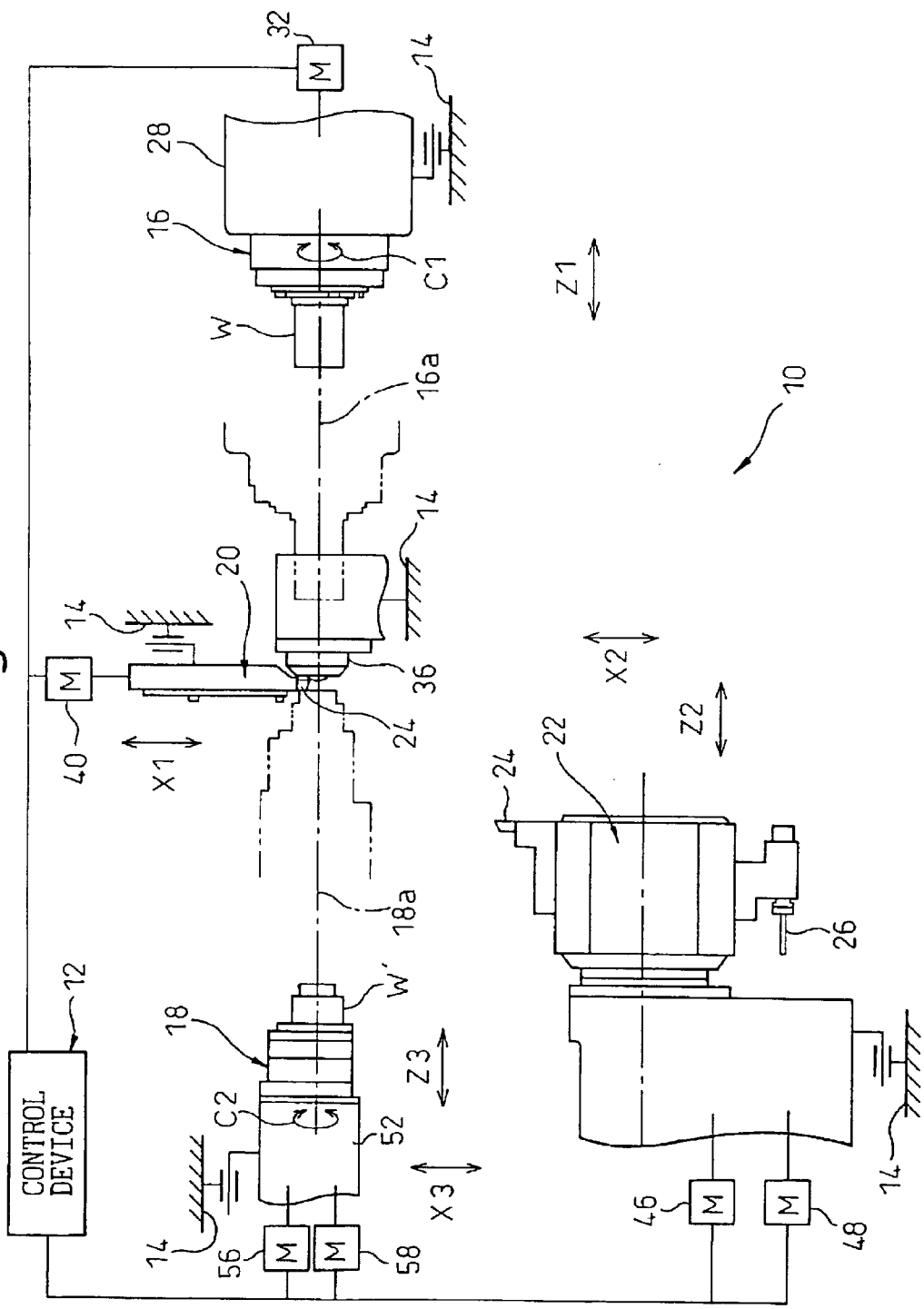

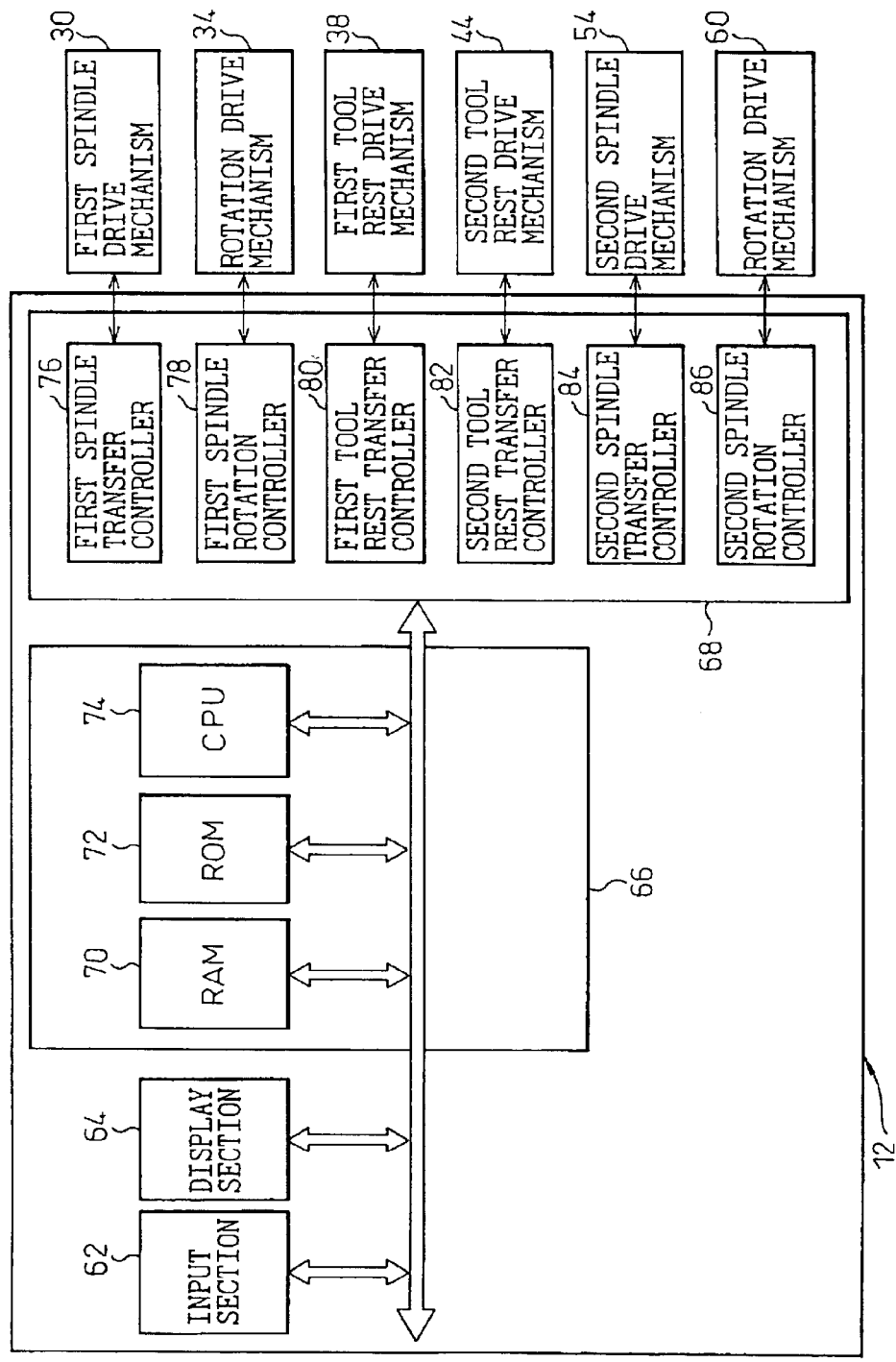

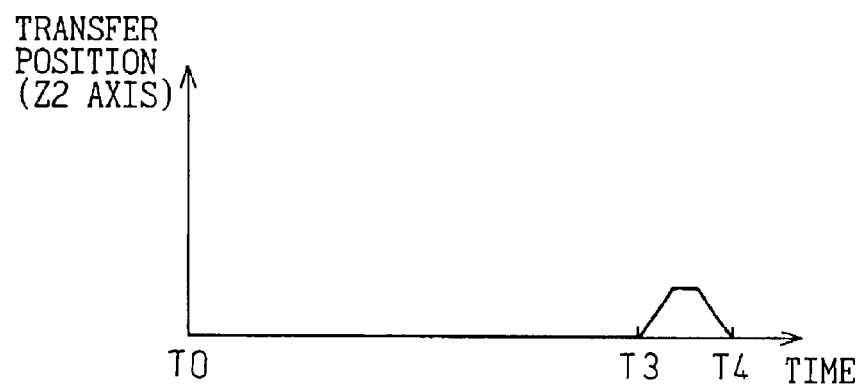

AUTOMATIC LATHE, METHOD FOR CONTROLLING THE SAME, AND DEVICE FOR CONTROLLING THE SAME

TECHNICAL FIELD

The present invention relates to an automatically operated lathe and method for controlling the same.

BACKGROUND ART

A turning machine tool capable of performing an automatic turning process (referred generically to as an automatically operated lathe in this specification) may automatically carry out various turning processes in sequence or, if necessary, simultaneously, by causing a feed motion of various tools carried on a tool rest relative to a bar-shaped or disk-shaped workpiece to be machined, which is securely held in a spindle. Recently, an automatically operated lathe of a type (so called an electronic-cam type) controlling a relative feed motion between a workpiece or spindle and a tool or tool rest by a machining command using a cam-reference data for successively directing tool positions as a function of cam rotation angles has been provided.

In the electronic-cam type automatically operated lathe, an electric operating command following a predetermined cam curve is used, in place of a mechanical operation of a cam used in a traditional cam-installed automatic lathe, to automatically control a relative feed motion between the spindle and the tool rest. Accordingly, the electronic-cam type automatically operated lathe is capable of advantageously performing a relatively simple machining sequence in a short time, due to respective motions of tools carried on plural tool rests, which follow individual cam curves in a way similar to the conventional cam-installed automatic lathe. In particular, according to such an electronic-cam system, it is not necessary to provide many types of mechanical cams corresponding to the configurations of machined products, and it is possible to significantly reduce time and labor required for an initial set-up, which permits various kinds of products to be manufactured in very high productivity in comparison with the conventional cam-installed automatic lathe.

Also, in the electronic-cam type automatically operated lathe, even when the machine structure thereof is provided with a plurality of control axes along which the spindle and the tool rest are relatively operated, it is possible to prepare cam diagrams for the respective control axes on a common reference (i.e., a cam rotation angle), which advantageously makes it easier to program a synchronizing command of the control axes. Moreover, the operation of the control axes is individually and freely controllable, so that, in the case where various machining processes are successibly performed by using plural tools, it is made easier to operate the tools so as to overlap in time, and thereby, it is possible to significantly reduce the time required for the entire machining process (i.e., one machining cycle) of the workpiece to be machined.

In the above-described electronic-cam type automatically operated lathe, the cam rotation angle as a reference for preparing the cam diagrams may be defined on the basis of a rotational frequency of the spindle. That is, a predetermined rotational frequency of the spindle is defined to correspond to a single rotation (360 degrees) of the cam, and tool positions are successively directed correspondingly to the rotational frequencies of the spindle, so as to control the operation of the respective control axes. According to this structure, it is possible to individually control the operation of the plural control axes on the basis of a common reference defined by the rotational frequency of the spindle that is a mechanically operative component of the automatically operated lathe.

However, in this structure, the operation of the control axes cannot be controlled during a period when the spindle does not rotate. Therefore, it is difficult, in the automatically operated lathe performing an electronic-cam control on the basis of the rotational frequency of the spindle, to carry out, for example, a secondary process (e.g., a cutting process by a rotary tool) during a period when the spindle does not rotate, which can be carried out by a conventional multi-functional numerically-controlled (NC) lathe. Also, when the compensation of the tool position to be directed, i.e., a tool offset, should be commanded due to, for example, a tool edge wearing or a tool changing, it is required to prepare the cam diagram in which the tool position is shifted in a desired offset value. In this case, the rotational frequency of the spindle corresponding to a cam single rotation is not changed, so that the cutting feed speed of the tool relative to a workpiece to be machined is varied, which may result in changing the roughness of a machined surface.

Contrary to this, in the conventional NC lathe, since a relative feed motion between a spindle and a tool rest is controlled to continuously move a tool toward a designated position on the basis of an elapsed time under the designation of a feed speed in the desired control axis, it is possible to command a tool offset without varying the cutting feed speed of the tool. However, a time required for one machining cycle is somewhat readily varied due to the way of arranging a machining program and the selection of the numerical value of input data, so that an operator's skill is necessary to efficiently program, for example, a synchronization command between plural control axes or a superposition command between axes-systems in a multi-axes, multi-path NC lathe.

Furthermore, in the case where various machining process are successively performed by using plural tools in the conventional NC lathe, it is generally difficult, from a viewpoint of machine and control structure, to perform a machining process of one tool until another tool reaches a stand-by position after finishing the machining process thereof, and thereby, the time required for one machining cycle inevitably includes the idle time of tools. In this respect, the electronic-cam type automatically operated lathe is capable of easily eliminating the idle time of tools as already described and, therefore, of effectively reducing the time required for one machining cycle in comparison with the conventional NC lathe.

DISCLOSURE OF THE INVENTION

An object of the present invention is to provide an automatically operated lathe which makes it possible to effectively reduce a time required for one machining cycle in comparison with a conventional NC lathe, and which includes multi-functional properties capable of performing a secondary process during a period when a spindle does not rotate, as well as to provide a method for controlling such an automatically operated lathe.

Another object of the present invention is to provide an automatically operated lathe which makes it possible to easily program a synchronization command between plural control axes and to command a tool offset without varying the cutting feed speed of the tool, as well as to provide a method for controlling such an automatically operated lathe.

To achieve the above object, the present invention provides in one aspect thereof a method for controlling an automatically operated lathe provided with at least one spindle and at least one tool rest, comprising providing each of a plurality of transfer position data required in a sequence of machining programs in connection with the at least one spindle and the at least one tool rest in a form of either one of two types of transfer position data, one of which is a cam-reference data directing a transfer position as a function of a cam rotation quantity and the other of which is a time-reference data directing a transfer position as a function of an elapsed time; and processing each of the plural transfer position data provided in the form of either one of the cam-reference data and the time-reference data, to control a relative feed motion between the at least one spindle and the at least one tool rest in the sequence of machining programs.

In the preferred embodiment, the method for controlling is provided, wherein the at least one spindle and the at least one tool rest are capable of performing a relative feed motion along a plurality of control axes, and wherein the step of providing the transfer position data includes providing each of the plural transfer position data in the form of either one of the cam-reference data and the time-reference data in relation to each of the plural control axes.

Also, in the preferred embodiment, the method for controlling is provided, further comprising a step of designating a time-series allocation of the plural transfer position data in the sequence of machining programs, wherein the step of processing the transfer position data includes processing, in accordance with the time-series allocation as designated, each of the plural transfer position data provided in the form of either one of the cam-reference data and the time-reference data.

Also, in the preferred embodiment, the method for controlling is provided, further comprising a step of showing, in a form of a displacement diagram, each of the plural transfer position data provided in the form of either one of the cam-reference data and the time-reference data.

In this arrangement, it is advantageous that the method further comprises a step of designating a time-series allocation of the plural transfer position data in the sequence of machining programs on the displacement diagram, and that the step of processing the transfer position data includes processing, in accordance with the time-series allocation as designated on the displacement diagram, each of the plural transfer position data provided in the form of either one of the cam-reference data and the time-reference data.

The step of processing the transfer position data may include processing, as a function of a pulse number corresponding to the cam rotation quantity, the transfer position directed by the cam-reference data.

In this arrangement, it is advantageous that the method further comprises a step of providing a pulse-train generating source for generating any pulse train, and that the step of processing the transfer position data includes processing the cam-reference data by using a pulse train generated through the pulse-train generating source.

In this case, the pulse-train generating source may generate a pulse train corresponding to a rotation of the at least one spindle.

The present invention provides in another aspect thereof an automatically operated lathe, comprising a lathe bed; at least one spindle mounted on the lathe bed; at least one tool rest mounted on the lathe bed; a control device for controlling an operation of the at least one spindle and the at least one tool rest on the lathe bed; the control device including an input section permitting an entering of each of a plurality of transfer position data required in a sequence of machining programs in connection with the at least one spindle and the at least one tool rest in a form of either one of two types of transfer position data, one of which is cam-reference data directing a transfer position as a function of a cam rotation quantity and the other of which is time-reference data directing a transfer position as a function of an elapsed time; and a processing section processing each of the plurality of transfer position data entered through the input section in the form of either one of the cam-reference data and the time-reference data, to thereby generate a control signal for controlling a relative feed motion between the at least one spindle and the at least one tool rest in the sequence of machining programs.

In the preferred embodiment, the automatically operated lathe is provided, wherein the at least one spindle and the at least one tool rest are capable of performing a relative feed motion along a plurality of control axes on the lathe bed, and wherein the input section of the control device permits an entering of each of the plurality of transfer position data in the form of either one of the cam-reference data and the time-reference data in relation to each of the plurality of control axes.

Also, in the preferred embodiment, the automatically operated lathe is provided, wherein the input section of the control device permits a designation of a time-series allocation of the plurality of transfer position data in the sequence of machining programs, and wherein the processing section of the control device processes, in accordance with the time-series allocation designated through the input section, each of the plurality of transfer position data entered in the form of either one of the cam-reference data and the time-reference data through the input section.

Also, in the preferred embodiment, the automatically operated lathe is provided, wherein the control device further includes a display section displaying, in a form of a displacement diagram, each of the plurality of transfer position data entered through the input section in the form of either one of the cam-reference data and the time-reference data.

In this arrangement, it is advantageous that the input section of the control device permits a designation of a time-series allocation of the plurality of transfer position data in the sequence of machining programs on the displacement diagram displayed in the display section, and that the processing section of the control device processes, in accordance with the time-series allocation as designated on the displacement diagram, each of the plurality of transfer position data entered in the form of either one of the cam-reference data and the time-reference data through the input section.

The processing section of the control device may process, as a function of a pulse number corresponding to the cam rotation quantity, the transfer position directed by the cam-reference data entered through the input section.

In this arrangement, it is advantageous that the lathe further comprises a pulse-train generating source for generating any pulse train, and that the processing section of the control device processes the cam-reference data by using a pulse train generated through the pulse-train generating source.

In this case, the pulse-train generating source may generate a pulse train corresponding to a rotation of the at least one spindle.

The present invention provides, in a further aspect thereof, a control device for use in an automatically operated lathe provided with at least one spindle and at least one tool rest, comprising an input section permitting an entering of each of a plurality of transfer position data required in a sequence of machining programs in connection with the at least one spindle and the at least one tool rest in a form of either one of two types of transfer position data, one of which is a cam-reference data directing a transfer position as a function of a cam rotation quantity and the other is a time-reference data directing a transfer position as a function of an elapsed time; and a processing section processing each of the plurality of transfer position data entered through the input section in the form of either one of the cam-reference data and the time-reference data, to thereby generate a control signal for controlling a relative feed motion between the at least one spindle and the at least one tool rest in the sequence of machining programs.

In the preferred embodiment, the control device is provided, wherein the input section permits designation of a time-series allocation of the plurality of transfer position data in the sequence of machining programs, and wherein the processing section processes, in accordance with the time-series allocation designated through the input section, each of the plurality of transfer position data entered in the form of either one of the cam-reference data and the time-reference data through the input section.

Also, in the preferred embodiment, the control device further comprises a display section displaying, in a form of a displacement diagram, each of the plurality of transfer position data entered through the input section in the form of either one of the cam-reference data and the time-reference data.

In this arrangement, it is advantageous that the input section permits a designation of a time-series allocation of the plurality of transfer position data in the sequence of machining programs on the displacement diagram displayed in the display section, and that the processing section processes, in accordance with the time-series allocation as designated on the displacement diagram, each of the plurality of transfer position data entered in the form of either one of the cam-reference data and the time-reference data through the input section.

The processing section may process, as a function of a pulse number corresponding to the cam rotation quantity, the transfer position directed by the cam-reference data entered through the input section.

BRIEF DESCRIPTION OF THE DRAWINGS

The above and other objects, features and advantages of the present invention will become more apparent from the following description of preferred embodiments with reference to the attached drawings, in which:

FIG. 1 is a flow chart showing the procedure of a method for controlling an automatically operated lathe, according to an embodiment of the present invention;

FIG. 6 is a schematic illustration showing the constitution of an automatically operated lathe, according to one embodiment of the present invention, which can perform the controlling method of FIG. 1;

FIG. 7 is a block diagram showing the constitution of a control device installed in the automatically operated lathe of FIG. 6;

FIG. 14 is a displacement diagram representing time-reference data for the other one control axes used in the machining sequence of FIG. 10;

BEST MODES FOR CARRYING OUT THE INVENTION

Figure 2A:
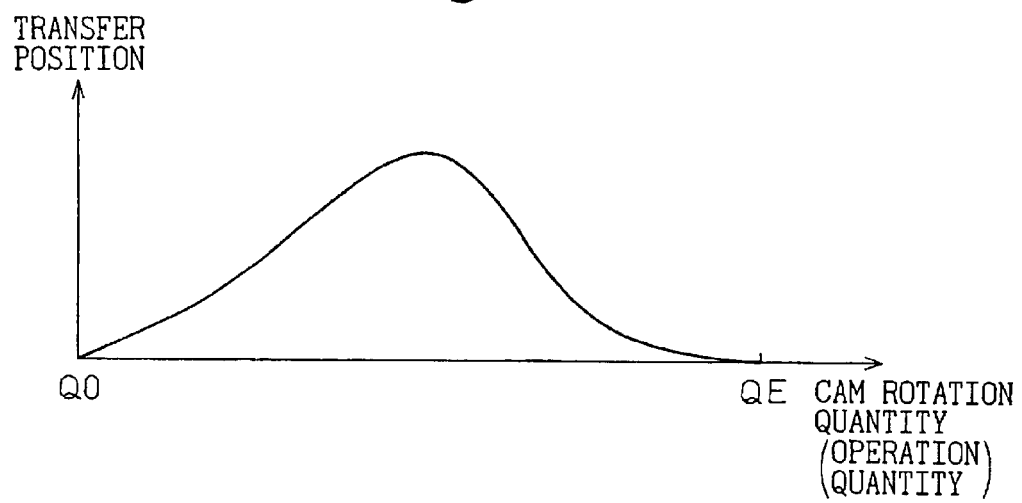
FIG. 2A is a displacement diagram representing one example of a cam-reference data used in the controlling method of FIG. 1.

With reference to the drawings, FIG. 1 is a flow chart showing the procedure of a controlling method of an automatically operated lathe, according to an embodiment of the present invention, and FIGS. 2A to 3C are displacement diagrams representing one example of plural transfer position data used in this controlling method.

The controlling method of an automatically operated lathe, according to the present invention, is constituted for controlling a relative feed motion between a spindle and a tool rest, which is carried out in accordance with a sequence of machining programs for cutting and machining one product from a workpiece to be machined, in an automatically operated lathe provided with at least one spindle and at least one tool rest. First, as shown in FIG. 1, each of a plurality of target or transfer position data (i.e., travel locus data) required in the sequence of machining programs in connection with at least one spindle and at least one tool rest is provided in the form of either one of two types of transfer position data, i.e., a cam-reference data (a step S1) directing a transfer position as a function of a cam rotation quantity and a time-reference data (a step S2) directing a transfer position as a function of an elapsed time.

Next, as occasion demands, a time-series allocation of the plural transfer position data, in the form of either one of the cam-reference data and the time-reference data provided in the steps S1 and S2, is designated in the sequence of machining programs (an optional step S3). Then, each of the plural transfer position data provided in the form of either one of the cam-reference data and the time-reference data is processed (in accordance with the time-series allocation if it has been designated) (a step S4), and a relative feed motion between at least one spindle and at least one tool rest in the sequence of machining programs is controlled (a step S5).

In the case where at least one spindle and at least one tool rest in the automatically operated lathe are capable of performing the relative feed motion along a plurality of control axes on a lathe bed, the steps for providing the transfer position data (the steps S1 and S2) include providing each of a plurality of transfer position data in the form of either one of the cam-reference data and the time-reference data in relation to each of the plural control axes.

In the step S1 as described, it is advantageous that the transfer position data required in, e.g., a process wherein an operation quantity for defining the cam rotation quantity (e.g., a cam rotation angle) is obtainable from any mechanically operative component in the automatically operated lathe, and/or a process wherein a tool offset due to a tool edge wearing or a tool changing is not commanded, among the plural processes carried out through the sequence of machining programs, are provided in the form of the cam-reference data. Also, in the step S2, it is advantageous that the transfer position data required in, e.g., a process wherein such an operation quantity is not obtainable from the mechanically operative component in the automatically operated lathe, and/or a process wherein a tool offset is commanded, are provided in the form of the time-reference data.

In this case, the cam-reference data is formed, while a predetermined operation quantity obtained from a desired mechanically operative component in the automatically operated lathe is defined to correspond to a single rotation of the cam, so as to successively direct the transfer positions of the spindle or the tool rest corresponding to the operation quantities. On the other hand, the time-reference data is used in place of the cam-reference data in the process wherein the mechanically operative component for obtaining the operation quantity is not operated, and/or in the process wherein the tool offset is commanded, among the plural processes, so as to successively direct the transfer positions of the spindle or the tool rest correspondingly to the elapsed times.

In the step S3, the time-series allocation of the plural transfer position data respectively corresponding to the plural processes in the sequence of machining programs is designated so as to permit the plural processes to be performed in the most suitable order. Thereby, cam-reference processes performed on the basis of the cam-reference data and time-reference processes performed on the basis of the time-reference data are arranged in the most suitable order. Accordingly, in the steps S4 and S5, it is possible to control the relative feed motion between the spindle and the tool rest, in each of the cam-reference and time-reference processes arranged in the most suitable order, in a way as to follow this order.

According to the above constitution, a so-called electronic-cam type control is carried out in the processes performed on the basis of the cam-reference data, which permits the operation of the plural control axes in the automatically operated lathe to be individually and freely controlled and, therefore, remarkable effects are obtained wherein the idle time of tools is easily eliminated and the time required for one machining cycle is effectively reduced in comparison with a conventional NC lathe. Moreover, in the processes performed on the basis of the cam-reference data, it is possible to prepare the displacement diagrams (or cam diagrams) regarding the respective control axes on the common reference (i.e., the cam rotation quantity), which results in such an advantage as to facilitate the programming of a synchronizing command of the control axes. Further, in the above constitution, it is possible to surely perform the processes generally unsuitable for the electronic-cam type control, such as a machining process for commanding a tool offset, by using the time-reference data.

In the above-described control flow according to the present invention, a step of showing, in the form of a displacement diagram representing a locus of transfer positions (e.g., a tool path), each of the plural transfer position data provided in the form of either one of cam-reference data and time-reference data, may be added in association with the steps S1 and S2 for providing transfer position data. In this case, it is advantageous to permit the step S3 of designating the time-series allocation of the plural transfer position data in the sequence of machining programs to designate the time-series allocation on the shown displacement diagram.

Figure 2B:
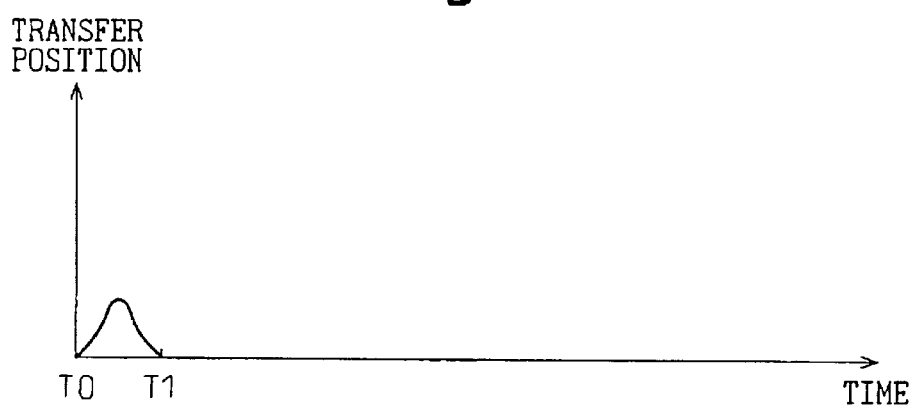
FIG. 2B is a displacement diagram representing one example of a time-reference data used in the controlling method of FIG. 1.

FIG. 2A is a displacement diagram (or a cam diagram) representing one example of a transfer position data provided in the form of a cam-reference data. FIG. 2B is a displacement diagram representing one example of a transfer position data provided in the form of a time-reference data. In these examples, most of the sequence of machining programs are carried out on the basis of the cam-reference data over a cam single rotation (Q0 to QE), and only a specific program is carried out on the basis of the time-reference data over a predetermined time (T0 to T1).

Figure 3A:
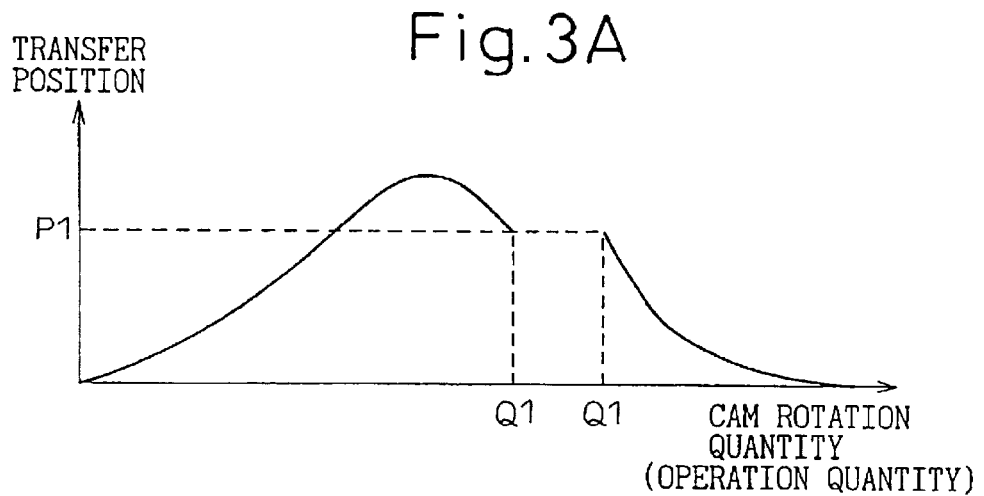
FIG. 3A is a displacement diagram representing the cam-reference data of FIG. 2A in a state after an interruption by the time-reference data thereto is designated.

Then, in the step S3, the time-series allocation of these two transfer position data may be designated on either one of the displacement diagrams. In the illustrated examples, a location is designated, where the time-reference data represented in the displacement diagram of FIG. 2B interrupts, on the displacement diagram representing the cam-reference data in FIG. 2A. FIG. 3A shows a displacement diagram representing the cam-reference data in a state after the interruption by the time-reference data is designated. In this example, the interruption by the time-reference data is designated at a location where the cam rotation quantity (e.g., the cam rotation angle) is Q1, whereby the displacement diagram is divided at the point (Q1, P1).

Therefore, in this example of a machining sequence, first on the basis of the cam-reference data, the relative feed motion between the spindle and the tool rest is controlled, as a cam-reference process, during a condition where the cam rotation quantity advances from Q0 to Q1. Once the cam rotation quantity reaches Q1, the cam-reference process is temporarily stopped. Next, on the basis of the time-reference data, the relative feed motion between the spindle and the tool rest is controlled, as a time-reference process, during the time from T0 to T1. After the time-reference process is finished at T1, the cam-reference process is again performed on the basis of the cam-reference data from the condition of the cam rotation quantity Q1. In this manner, one machining cycle is completed.

Figure 3B:
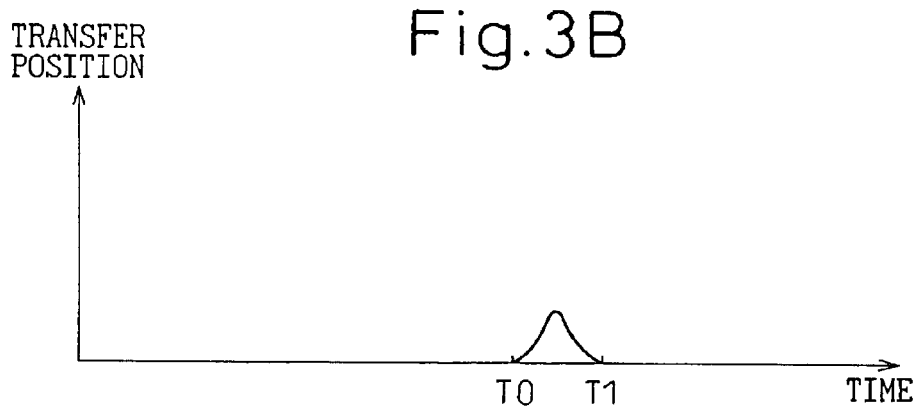
FIGS. 3B and 3C are displacement diagrams respectively representing the time-reference data of FIG. 2B in a state after the interruption is designated.
Figure 3C:
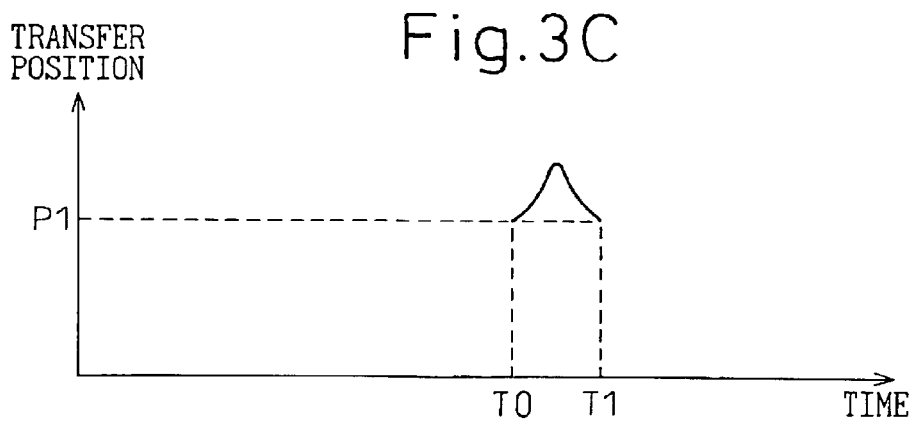

In the above machining sequence example, if the control axis operationally controlled on the basis of the cam-reference data is different from the control axis operationally controlled on the basis of the time-reference data, it is possible to allocate the displacement diagram representing the time-reference data irrespective of the transfer position P1 at the interrupted location on the displacement diagram of the cam-reference data, as shown in FIG. 3B. Contrary to this, if the interruption by the time-reference data to the cam-reference data is performed on the same control axis, the displacement diagram representing the time-reference data is allocated in such a manner as to continue the transfer position P1 at the interrupted location on the displacement diagram of the cam-reference data, as shown in FIG. 3C.

In the above-described step S4, the transfer position directed by the cam-reference data may be processed as a function of the number of pulse, which corresponds to the cam rotation quantity. In this case, it is advantageous that a pulse-train generating source for generating any pulse train is previously provided, and that the cam-reference data is processed by using a pulse train generated through the pulse-train generating source. According to this arrangement, it is possible to acquire the operation quantity for defining the cam rotation quantity in the form of a pulse train, which facilitates the processing step.

Figure 4:
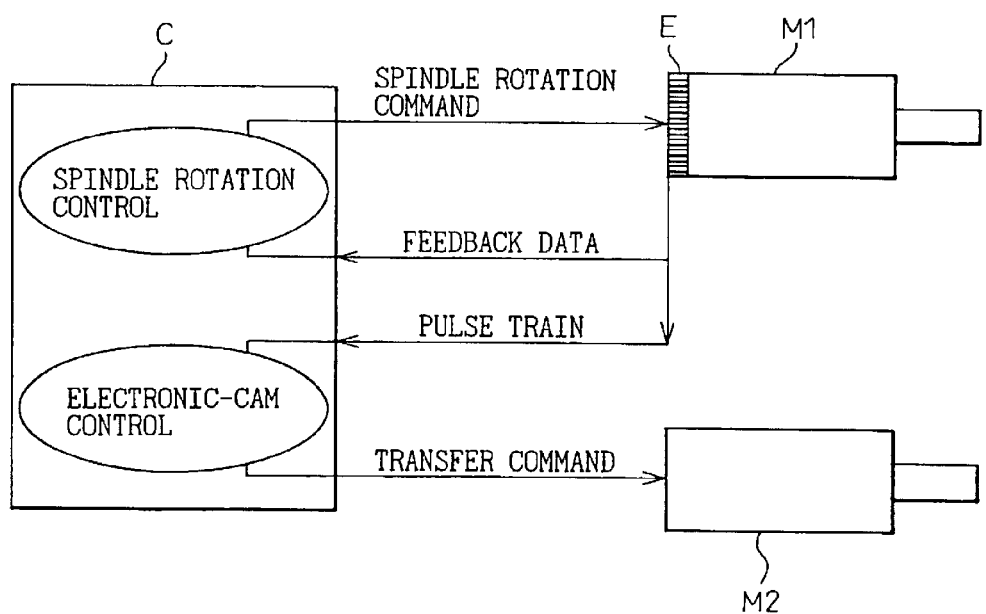
FIG. 4 is a block diagram showing a system for specifying a cam-rotation quantity of the cam-reference data used in the controlling method of FIG. 1.

The pulse-train generating source may be constructed so as to generate a pulse train corresponding to a rotation of at least one spindle of the automatically operated lathe. In this case, it is advisable that, as shown in FIG. 4, a control device C installed in the automatically operated lathe is constituted to use a pulse train output from an encoder E provided in a spindle motor M1 for a spindle rotation control as a feedback data as well as for processing the cam-reference data in the above-described electronic-cam control. In this arrangement, the control device C operates and processes the transfer positions directed through the cam-reference data by using the pulse train acquired from the encoder E, and outputs a transfer command based thereon so as to control the operation of a control axis motor M2.

According to the above arrangement, it is possible to control the relative feed motion between the spindle and the tool rest through the electronic-cam control, by effectively using the rotation of the spindle as a main operative component of the automatically operated lathe. Further, in the present invention, the sequence of machining programs is capable of being performed with the process based on the cam-reference data being properly combined with the process based on the time-reference data as already described, so that it is possible to surely perform a secondary process, such as a cutting process by a rotary tool, on the basis of the time-reference data, even when the spindle does not operate.

Figure 5A:
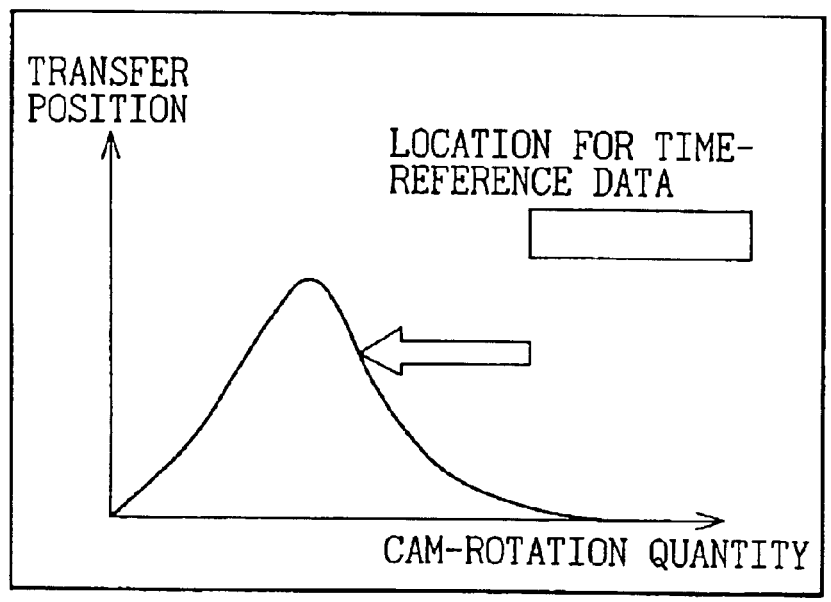
FIGS. 5A and 5B are illustrations of display screen pictures, each showing a step for designating a time-series allocation in the controlling method of FIG. 1.
Figure 5B:
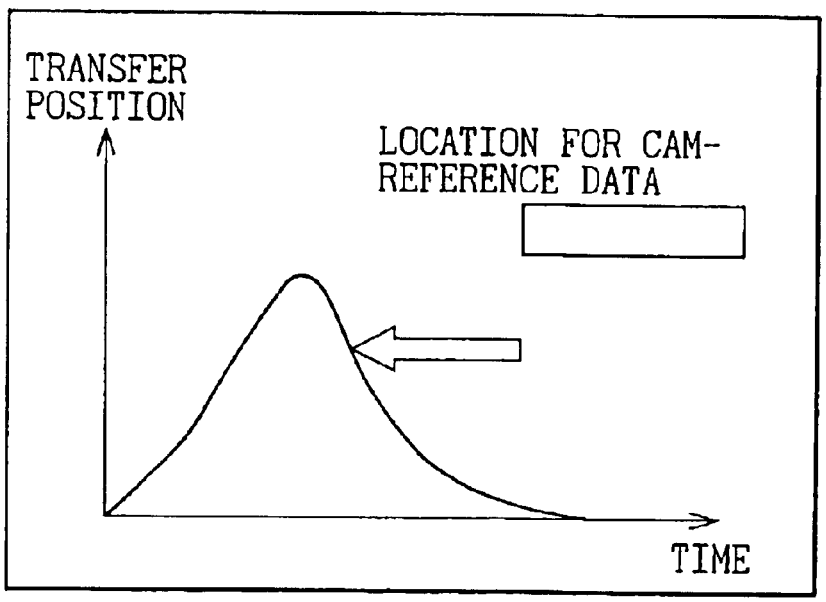

As described with reference to the above machining sequence example, when the time-series allocation of the plural transfer position data in the sequence of machining programs is designated on the displacement diagrams, it is advantageous that the desired displacement diagram is displayed on a display screen provided, e.g., in association with the control device of the automatically operated lathe. In this case, as shown in FIG. 5A, a location where the time-reference data interrupts may be directed by a screen picture such as an arrow, on the screen displaying the displacement diagram of the cam-reference data. Alternatively, the location for the interruption may be directed by entering a numerical data, such as a cam rotation angle, the number of pulse or a process number (e.g., a tool number). Also, as shown in FIG. 5B, a location where the cam-reference data interrupts may be directed by a screen picture such as an arrow, on the screen displaying the displacement diagram of the time-reference data. Alternatively, the location for the interruption may be directed by entering a numerical data, such as a time or a process number (e.g., a tool number).

It will be appreciated that the preparation of the above-described displacement diagrams may be performed not only in the control device previously installed in the automatically operated lathe, but also in an outside computer. Also, numerical data describing numerical control program may be used, by way of example but not exclusively, as the time-reference data.

Following is the description of the constitution of an automatically operated lathe 10 (see FIG. 6) as well as of a control device 12 (see FIG. 7) installed in the automatically operated lathe 10, each according to one embodiment of the present invention, and each capable of carrying out the automatically operated lathe controlling method according to the invention. The automatically operated lathe 10 includes two spindles 16, 18 and two tool rests 20, 22, intensively mounted on a common lathe bed 14, and has a multifunctional arrangement capable of performing a simultaneous machining of different processes (e.g., an outer-diametrical turning and a boring) for an identical workpiece and/or a simultaneous machining for different workpieces by various tools including a cutting tool 24 for a turning process, such as a turning tool or a drill, and a rotary tool 26 such as a milling cutter.

As shown in FIG. 6, the automatically operated lathe 10 includes a lathe bed 14, a first spindle 16 mounted on the lathe bed 14 and having a rotation axis 16a, a first tool rest 20 mounted on the lathe bed 14 and capable of holding a plurality of tools 24, 26 in parallel rows, a second tool rest 22 mounted on the lathe bed 14 and capable of holding a plurality of tools 24, 26 in a circumferentially distributed manner, a second spindle 18 mounted on the lathe bed 14 and having a rotation axis 18a parallel to the rotation axis 16a of the first spindle 16 to be capable of oppositely facing the first spindle 16, and a control device 12 for controlling the operation of the first and second spindles 16, 18 as well as of the first and second tool rests 20, 22 on the lathe bed 14.

The lathe bed 14 carries independently the first spindle 16, the second spindle 18, the first tool rest 20 and the second tool rest 22 in a respectively movable manner in a predetermined rectangular coordinate system.

The first spindle 16 is a main (or front-side) spindle which securely holds a bar-shaped workpiece W to be machined (hereinafter referred to as a bar) supplied from an outside of the lathe and rotates therewith, and is rotatably supported within a first spindle stock 28 through a bearing unit not illustrated. The first spindle 16 has a hollow tubular structure, and is equipped at the front end region thereof with a chuck (not shown) capable of firmly and securely holding the bar W supplied from the rear end region. The lathe bed 14 is equipped with a first spindle drive mechanism 30 (FIG. 7) for linearly transferring the first spindle stock 28 along a first feed-control axis (referred to as a Z1-axis) parallel to the rotation axis 16a of the first spindle 16 in a three-axis rectangular coordinate system defined on the lathe bed 14.

The first spindle drive mechanism 30 is constituted from a Z1-axis drive source (e.g., an AC servo motor) 32, as well as a Z1-axis guide member (e.g., a slide guide) and a feed screw unit (e.g., a ball screw), both not illustrated. Consequently, the first spindle 16 is capable of linearly reciprocating along the first feed-control axis (Z1-axis)

parallel to its own rotation axis 16a, together with the first spindle stock 28, due to the operation of the first spindle drive mechanism 30.

The first spindle stock 28 is also equipped therein with a rotation drive source 34 (FIG. 7), such as a built-in AC servo motor, for rotationally driving the first spindle 16. Also, the first spindle 16 may have a rotation-angle control axis (referred to as a C1-axis), which makes it possible to perform various secondary machining processes at desired positions on the end and/or circumferential surface of the bar W securely held by the chuck, by using rotary tools 26 carried on the desired tool rests 20, 22, due to an indexable positioning operation in the C1-axis obtained by controlling the rotation drive source 34.

The lathe bed 14 is equipped, at a predetermined location spaced axially forward from the first spindle stock 28, with a guide bush 36 as an auxiliary support unit for supporting the bar W securely held in the first spindle 16 at a position near a leading end length to be machined of the bar. The guide bush 36 is disposed coaxially relative to the first spindle 16 and supports the bar W in a centering manner so as to prevent the length to be machined of the bar from running-out during the turning process thereof.

Figure 8:
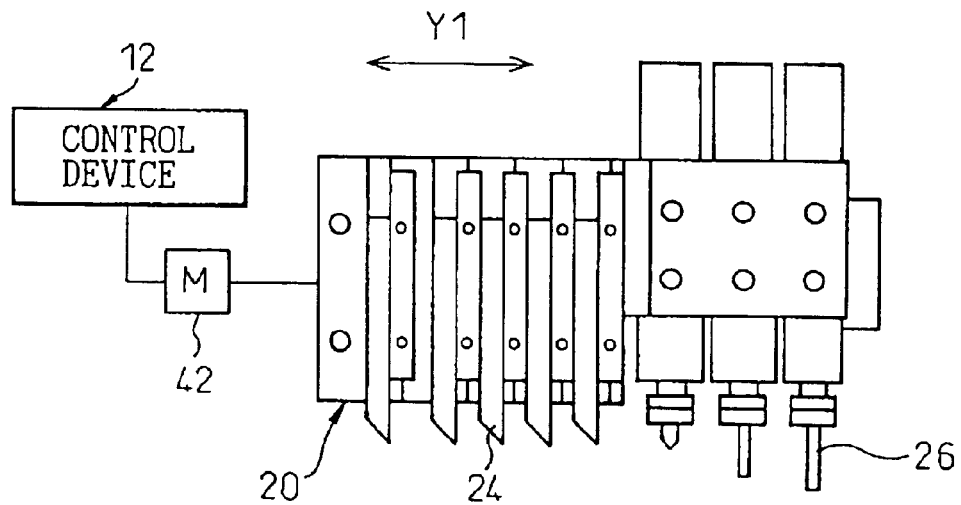
FIG. 8 is an enlarged front view of a first tool rest mounted on the automatically operated lathe of FIG. 6.

The first tool rest 20 is disposed on the lathe bed 14 at a location laterally retreated from the guide bush 36 positioned axially forward of the first spindle 16. The lathe bed 14 is equipped with a first tool rest drive mechanism 38 (FIG. 7) for linearly transferring the first tool rest 20 along a second feed-control axis (referred to as an X1-axis) parallel to the rotation axis 16a of the first spindle 16 (i.e., the first feed-control axis (Z1-axis)) in a three-axis rectangular coordinate system defined on the lathe bed 14. As shown in FIG. 8, the first tool rest drive mechanism 38 is capable of linearly transferring the first tool rest 20 along a third feed-control axis (referred to as a Y1-axis) orthogonal to both the first feed-control axis (Z1-axis) and the second feed-control axis (X1-axis).

The first tool rest drive mechanism 38 is constituted from an X1-axis drive source (e.g., an AC servo motor) 40, an X1-axis guide member (e.g., a slide guide) and a feed screw unit (e.g., a ball screw), both not illustrated, as well as a Y1-axis drive source (e.g., an AC servo motor) 42 (FIG. 8), a Y1-axis guide member (e.g., a slide guide) and a feed screw unit (e.g., a ball screw), both not illustrated. Consequently, the first tool rest 20 is capable of linearly reciprocating along the second feed-control axis (X1-axis) and the third feed-control axis (Y1-axis) due to the operation of the first tool rest drive mechanism 38.

The first tool rest 20 is a so-called flat turret tool rest capable of holding a plurality of tools 24, 26 in parallel rows. Therefore, the first tool rest 20 is capable of transferring, along a designated tool path, the cutting edge of the desired tool 24, 26 selected in an indexing manner by the Y1-axis motion of the first tool rest, due to the cooperation of the X1-axis feed motion of the first tool rest 20 and the above-described Z1-axis feed motion of the first spindle 16 according to the machining programs as described later. Consequently, it is possible to machine the bar W securely held in the first spindle 16 into a desired shape by using desired tools 24, 26 on the first tool rest 20.

In the illustrated embodiment, the second tool rest 22 is disposed on the lathe bed 14 at a location opposite to the first tool rest 20 in relation to the rotation axis 16a of the first spindle 16. The lathe bed 14 is equipped with a second tool rest drive mechanism 44 (FIG. 7) for linearly transferring the second tool rest 22 along a fourth feed-control axis (referred to as an X2-axis) orthogonal to the rotation axis 16a of the first spindle 16 (i.e., the first feed-control axis (Z1-axis)) and a fifth feed-control axis (referred to as a Z2-axis) parallel to the first feed-control axis (Z1-axis), respectively, in a two-axis rectangular coordinate system defined on the lathe bed 14.

The second tool rest drive mechanism 44 is constituted from an X2-axis drive source (e.g., an AC servo motor) 46, an X2-axis guide member (e.g., a slide guide) and a feed screw unit (e.g., a ball screw), both not illustrated, as well as a Z2-axis drive source (e.g., an AC servo motor) 48, a Z2-axis guide member (e.g., a slide guide) and a feed screw unit (e.g., a ball screw), both not illustrated. Consequently, the second tool rest 22 is capable of linearly reciprocating along the fourth feed-control axis (X2-axis) and the fifth feed-control axis (Z2-axis) due to the operation of the second tool rest drive mechanism 44.

Figure 9:
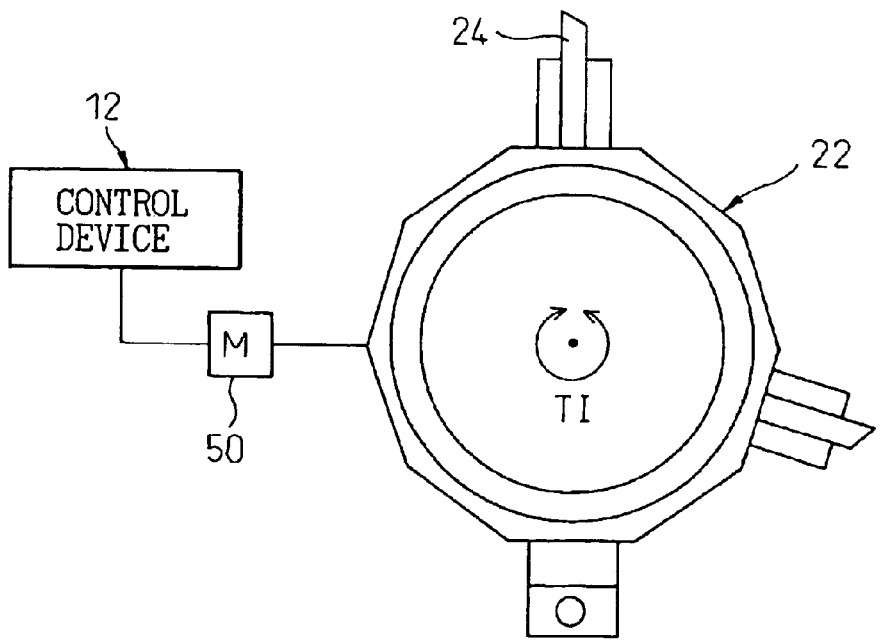
FIG. 9 is an enlarged front view of a second tool rest mounted on the automatically operated lathe of FIG. 6.

The second tool rest 22 is a so-called turret tool rest capable of holding a plurality of tools 24, 26 in a circumferentially distributed manner, and rotates in an indexing manner about a rotational index-control axis (referred to as a TI axis) parallel to the Z2-axis due to the operation of an index drive source 50 (e.g., an AC servo motor), as shown in FIG. 9. Therefore, the second tool rest 22 is capable of transferring, along a designated tool path, the cutting edge of the desired tool 24, 26 selected in an indexing manner by the TI-axis rotation of the second tool rest, due to the cooperation of the X2-axis feed motion and the Z2-axis feed motion of the second tool rest 22 according to the machining programs as described later. Consequently, it is possible to machine the bar W securely held in the first or second spindle 16, 18 into a desired shape by using desired tools 24, 26 on the second tool rest 22.

The second spindle 18 is disposed on the lathe bed 14 at a location axially forward of the first spindle 16 or the guide bush 36 with the rotation axis 18a being parallel to the rotation axis 16a of the first spindle 16 so as to be capable of oppositely facing the guide bush in a coaxial manner. The second spindle 18 is an auxiliary (or rear-side) spindle which securely holds a bar W as a blank passed from the first spindle 16 and rotates therewith, and is rotatably supported within a second spindle stock 52 through a bearing unit not illustrated. The second spindle 18 has a hollow tubular structure, and is equipped at the front end region thereof with a chuck (not shown) capable of firmly and securely holding the bar W' fed from the opposed guide bush 36.

The lathe bed 14 is equipped with a second spindle drive mechanism 54 (FIG. 7) for linearly transferring the second spindle stock 52 along a sixth feed-control axis (referred to as an X3-axis) orthogonal to the first feed-control axis (Z1-axis) of the first spindle 16 and a seventh feed-control axis (referred to as a Z3-axis) parallel to the first feed-control axis (Z1-axis), respectively, in a two-axis rectangular coordinate system defined on the lathe bed 14.

The second spindle drive mechanism 54 is constituted from an X3-axis drive source (e.g., an AC servo motor) 56, an X3-axis guide member (e.g., a slide guide) and a feed screw unit (e.g., a ball screw), both not illustrated, as well as a Z3-axis drive source (e.g., an AC servo motor) 58, a Z3-axis guide member (e.g., a slide guide) and a feed screw unit (e.g., a ball screw), both not illustrated. Consequently, the second spindle 18 is capable of linearly reciprocating along the sixth feed-control axis (X3-axis) and the seventh feed-control axis (Z3-axis), together with the second spindle stock 52, respectively, due to the operation of the second spindle drive mechanism 54.

The second spindle stock 52 is also equipped therein with a rotation drive source 60 (FIG. 7), such as a built-in AC servo motor, for rotationally driving the second spindle 18. Also, the second spindle 18 may have a rotation-angle control axis (referred to as a C2-axis), which makes it possible to perform various secondary machining processes at desired positions on the end and/or circumferential surface of the bar W' securely held by the chuck, by using rotary tools 26 carried on the second tool rest 22, due to an indexable positioning operation in the C2-axis obtained by controlling the rotation drive source 60.

The automatically operated lathe 10 is constructed so as to automatically and respectively machine the bars W, W' securely held in the front-side spindle 16 and the rear-side spindle 18, by using the desired tools 24, 26 selected in the two tool rests 20, 22 having the above structure, under the control of the control device 12. FIG. 7 shows the constitution of the control device 12 for carrying out such an automatic machining.

The control device 12 includes an input section 62, a display section 64, an arithmetic control section 66 and a servo control section 68. The input section 62 includes a keyboard or a pointing device, not illustrated, and makes it possible for an operator to enter directions and data in an interactive manner while referring various screens displayed in the display section 64. In the automatically operated lathe 10, data (such as a tool selection, a product's shape and dimension, a spindle rotation frequency, a tool feed rate, etc.) required for controlling the operation of each of the first and second spindles 16, 18 as well as the first and second tool rests 20, 22 are entered through the input section 62. The display section 64 includes a display unit, such as a CRT (cathode-ray tube) or an LCD (liquid crystal display), not illustrated, and displays data input images and/or prepared machining programs so as to permit an interactive entering operation by an operator.

The arithmetic control section 66 includes a RAM (random access memory) 70 and a ROM (read only memory) 72, both constituting a storage section, as well as a CPU (central processing unit) 74 constituting a processing section. The various kinds of data entered through the input section 62 are stored in the RAM 70 or the ROM 72 under the instructions from the CPU 74. The ROM 72 also previously stores a controlling program for operating the first and second spindles 16, 18 as well as the first and second tool rests 20, 22. The CPU 74 outputs a controlling command on the basis of the data stored in the RAM 70 or the ROM 72 to the servo control section 68 in accordance with a machining program prepared through a procedure as described later and the controlling program stored in the ROM 72.

The servo control section 68 includes a first spindle transfer controller 76, a first spindle rotation controller 78, a first tool rest transfer controller 80, a second tool rest transfer controller 82, a second spindle transfer controller 84 and a second spindle rotation controller 86. The first spindle transfer controller 76 operates, under the command from the CPU 74, the Z1-axis drive source 32 of the first spindle drive mechanism 30 so as to transfer the first spindle 16 along the Z1-axis together with the first spindle stock 28. The first spindle rotation controller 78 operates, under the command from the CPU 74, the rotation drive source 34 so as to rotate the first spindle 16 on the C1-axis in the first spindle stock 28. In this respect, the high-speed rotation of the first spindle 16 for a turning process is controlled through another control circuit, not illustrated, on the basis of data such as a rotational frequency.

The first tool rest transfer controller 80 operates, under the command from the CPU 74, either the X1-axis drive source 40 or the Y1-axis drive source 42 of the first tool rest drive mechanism 38 so as to transfer the first tool rest 20 along the X1-axis or the Y1-axis. The second tool rest transfer controller 82 operates, under the command from the CPU 74, either the X2-axis drive source 46 or the Z2-axis drive source 48 of the second tool rest drive mechanism 44 so as to transfer the second tool rest 22 along the X2-axis or the Z2-axis.

The second spindle transfer controller 84 operates, under the command from the CPU 74, either the X3-axis drive source 56 or the Z3-axis drive source 58 of the second spindle drive mechanism 54 so as to transfer the second spindle 18 along the X3-axis or the Z3-axis. The second spindle rotation controller 86 operates, under the command from the CPU 74, the rotation drive source 60 so as to rotate the second spindle 18 on the C2-axis in the second spindle stock 52. In this respect, the high-speed rotation of the second spindle 18 for a turning process is controlled through another control circuit, not illustrated, on the basis of data such as a rotational frequency.

It will be appreciated that the constitution of the control device 12 as shown by the block diagram of FIG. 7 corresponds to the constitution of a conventional numerical controlled (NC) lathe. However, the control device 12 of the present invention is not limited to this block diagram but may have various other constitutions.

The control device 12, constituting the above-described control system, adopts the characteristic features as described below, for carrying out the automatically operated lathe controlling method according to the invention so as to have the automatically operated lathe 10 fully exerted the multifunctional properties inherent therein and to effectively reduce a time required for carrying out the sequence of machining programs for the bars W, W'.

That is, the input section 62 permits an entering of each of a plurality of target or transfer position data, required in a sequence of machining programs in connection with the first and second spindles 16, 18 and the first and second tool rests 20, 22 of the automatically operated lathe 10, in the form of either one of two types of transfer position data, one of which is a cam-reference data directing a transfer position as a function of a cam rotation quantity and the other is a time-reference data directing a transfer position as a function of an elapsed time. Also, the input section 62 permits a designation of a time-series allocation of the plural transfer position data, entered in the form of either one of the cam-reference data and the time-reference data, in the sequence of machining programs.

The CPU 74 of the arithmetic control section 66 is capable of processing each of the plural transfer position data entered through the input section 62 in the form of either one of the cam-reference data and the time-reference data, in accordance with the time-series allocation if it is designated through the input section 62. Then, the CPU 74 generates a control signal for controlling a relative feed motion between the first and second spindles 16, 18 and the first and second tool rests 20, 22 in the sequence of machining programs.

In the input section 62, it is advantageous that the transfer position data required in, e.g., a process wherein an operation quantity for defining the cam rotation quantity (e.g., a cam rotation angle) is obtainable from a desired mechanically operative component in the automatically operated lathe 10, and/or a process wherein a tool offset due to the edge wearing of the tools 24, 26 or the changing of the tools 24, 26 is not commanded, among the plural processes carried out through the sequence of machining programs, are provided in the form of the cam-reference data. Also, it is advantageous that the transfer position data required in, e.g., a process wherein such an operation quantity is not obtainable from the mechanically operative component in the automatically operated lathe 10, and/or a process wherein a tool offset is commanded, are provided in the form of the time-reference data.

In this case, the cam-reference data is formed, while a predetermined operation quantity obtained from a desired mechanically operative component in the automatically operated lathe 10 is defined to correspond to a single rotation of the cam, so as to successively direct the transfer positions of either one of the first and second spindles 16, 18 and the first and second tool rest 20, 22 corresponding to the operation quantities. On the other hand, the time-reference data is used in place of the cam-reference data in the process wherein the mechanically operative component for obtaining the operation quantity is not operated, and/or in the process wherein the tool offset is commanded, among the plural processes, so as to successively direct the transfer positions of either one of the first and second spindles 16, 18 and the first and second tool rests 20, 22 corresponding to the elapsed times.

Also, in the input section 62, it is possible to designate the time-series allocation of the plural transfer position data in the sequence of machining programs, in relation to each of the plural control axes (X1, Y1, Z1, X2, Z2, X3, Z3) of the automatically operated lathe 10. Thereby, cam-reference processes performed on the basis of the cam-reference data and time-reference processes performed on the basis of the time-reference data are arranged in the most suitable order. Accordingly, the CPU 74 processes each of the plural transfer position data entered in the form of either one of the cam-reference data and the time-reference data, in accordance with the time-series allocation designated through the input section, and generates a control signal for controlling a relative feed motion between the first and second spindles 16, 18 and the first and second tool rests 20, 22, so as to output it to the servo control section 68. In this manner, it is possible to perform the plural processes in the sequence of machining programs in the most suitable combination of the cam-reference processes and the time-reference processes.

The display section 64 of the control device 12 is capable of displaying each of the plural transfer position data entered through the input section 62 in the form of either one of the cam-reference data and the time-reference data, in the form of a displacement diagram representing a locus of transfer positions (e.g., a tool path). The input section 62 permits a designation of the time-series allocation of the cam-reference data and the time-reference data on any one displacement diagram displayed in the display section 64, as described with reference to FIGS. 5A and 5B.

The CPU 74 is also capable of processing the transfer position directed by the cam-reference data entered through the input section 62, as a function of the number of pulse (or a pulse number) corresponding to the cam rotation quantity. In this case, it is advantageous that a pulse-train generating source for generating any pulse train is further provided, and that the CPU 74 processes the cam-reference data by using a pulse train generated through the pulse-train generating source.

The pulse-train generating source may be structured so as to generate a pulse train corresponding to a rotation of the first spindle 16 of the automatically operated lathe 10. In this case, it is advisable that the CPU 74 of the control device 12 is arranged so as to use a pulse train generated from an encoder (not shown) provided in a built-in AC servo motor as a rotation drive source 34 of the first spindle 16 for a spindle rotation control as a feedback data as well as for processing the cam-reference data in the above-described electronic-cam control, as already described with reference to FIG. 4. In this arrangement, the CPU 74 operates and processes the transfer positions directed through the cam-reference data by using the pulse train acquired from the encoder, and outputs a transfer command based thereon to the servo control section 68. Consequently, the operation of the respective axis drive sources 32, 40, 42, 46, 48, 56, 58 of the respective control-axis drive mechanisms 30, 38, 44, 54 are controlled on the basis of the cam-reference data.

According to the above constitution, it is possible for the control device 12 to control the first spindle drive mechanism 30, the first tool rest drive mechanism 38, the second tool rest drive mechanism 44 and the second spindle drive mechanism 54 in a mutually associated manner, so as to carry out the sequence of machining programs for the bars W, W' in the most suitable combination of the cam-reference processes and the time-reference processes.

One example of a machining sequence carried out through the above-described sequence of machining programs is described below, with reference to FIG. 10. In the machining sequence example of FIG. 10, a cutting tool (a turning tool) 24 carried on the first tool rest 20 performs an outer-diametrical turning process on the bar W securely held in the first spindle 16, under the cooperation of the Z1-axis feed motion of the first spindle 16 and the X1-axis feed motion of the first tool rest 20. After the outer-diametrical turning process is finished, the rotation of the first spindle 16 is halted, and the rotary tool 26 carried on the second tool rest 22 performs a lateral-surface drilling process to the bar W securely held in the first spindle 16, under the X2-axis feed motion of the second tool rest 22.

After the lateral-surface drilling process is finished, the second spindle 18 is operated to carry out the Z3-axis feed motion while the rotation thereof is halted, and the chuck provided therein is operated to hold the leading end portion of the bar W. During this state, the first spindle 16 and the second spindle 18 are operated to rotate in a synchronized manner. Then, a cutting tool (a turning tool) 24 carried on the first tool rest 20 performs a parting process to the bar W securely held in both the first and second spindles 16, 18, under the X1-axis feed motion of the first tool rest 20, so as to separate the bar into a bar W1 as a blank and a bar w as being not machined. In this way, the workpiece to be machined is passed or delivered from the first spindle 16 to the second spindle 18. In this respect, after the lateral-surface drilling process is finished, the second tool rest 22 is operated for indexing rotation, so as to position a cutting tool (a drill) 24 used in the next machining process at a working location. Moreover, after the parting process is finished, the first tool rest 20 is shifted back to an initial position, and, after the delivery is finished, the first spindle 16 is also shifted back to an initial position.

Next, the second spindle 18 is transferred to a position oppositely facing to the cutting tool (the drill) 24 carried on the second tool rest 22, under the cooperation of the X3-axis feed motion and the Z3-axis feed motion of the second spindle. In this position, the cutting tool (the drill) 24 carried on the second tool rest 22 performs an end-surface drilling process to the bar W' securely held in the rotating second spindle 18, under the Z2-axis feed motion of the second tool rest 22.

Figure 10:
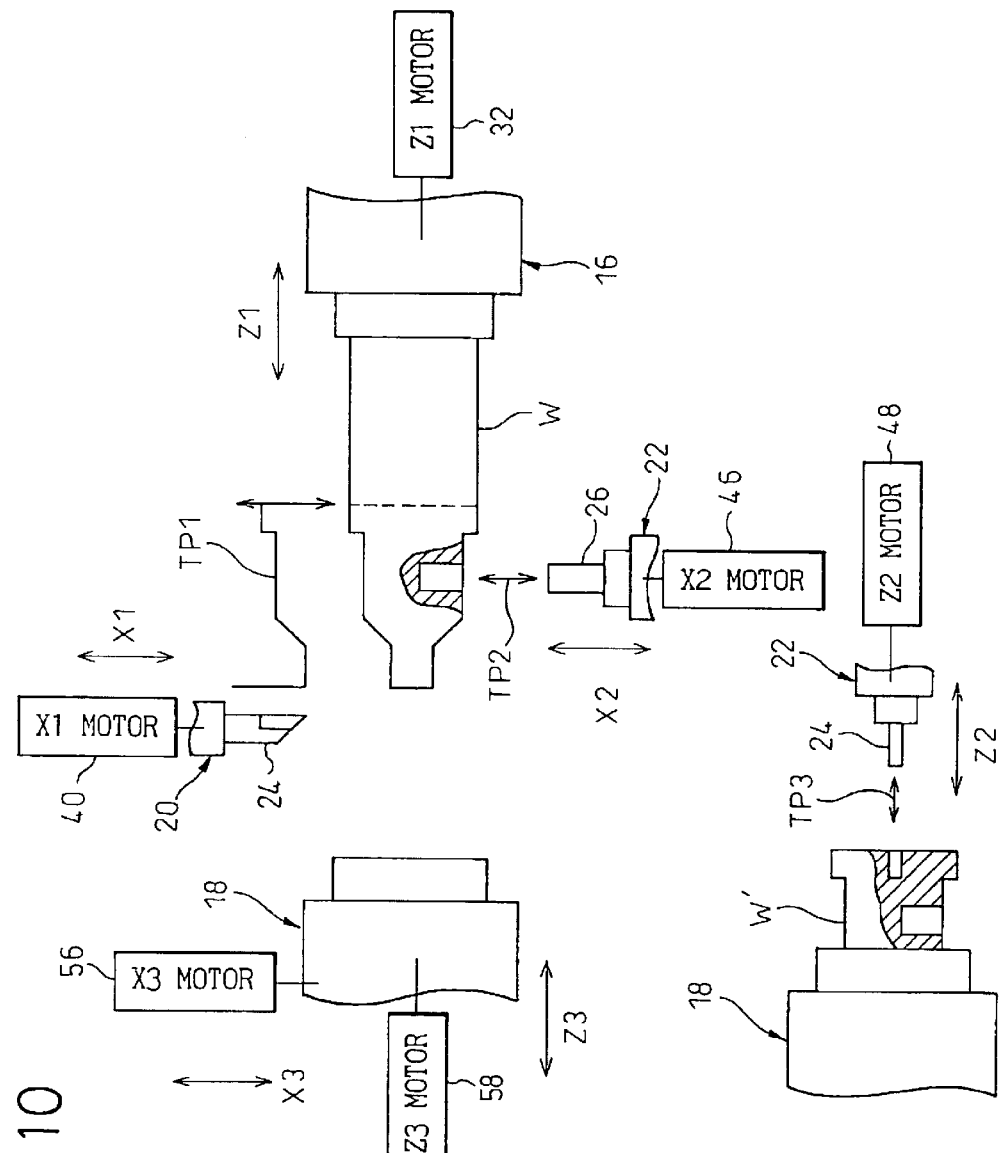
FIG. 10 is a schematic illustration showing an example of a machining sequence performed on the automatically operated lathe of FIG. 6.

FIG. 10 illustrates a tool path of the cutting tool (the turning tool) 24 carried on the first tool rest 20 by an arrow TP1. Also, a tool path of the rotary tool 26 carried on the second tool rest 22 is illustrated by an arrow TP2. Moreover, a tool path of the cutting tool (the drill) 24 carried on the second tool rest 22 is illustrated by an arrow TP3.

A plurality of transfer position data used in the above-described example of machining sequence will be described below with reference to displacement diagrams shown in FIGS. 11 to 15B. In this machining sequence example, the cam rotation quantity is defined by a pulse number counted in a pulse train generated correspondingly to the rotation of the first spindle 16. Therefore, the processes based on the time-reference data are basically carried out during a period when the first spindle 16 does not rotate.

Figure 11:
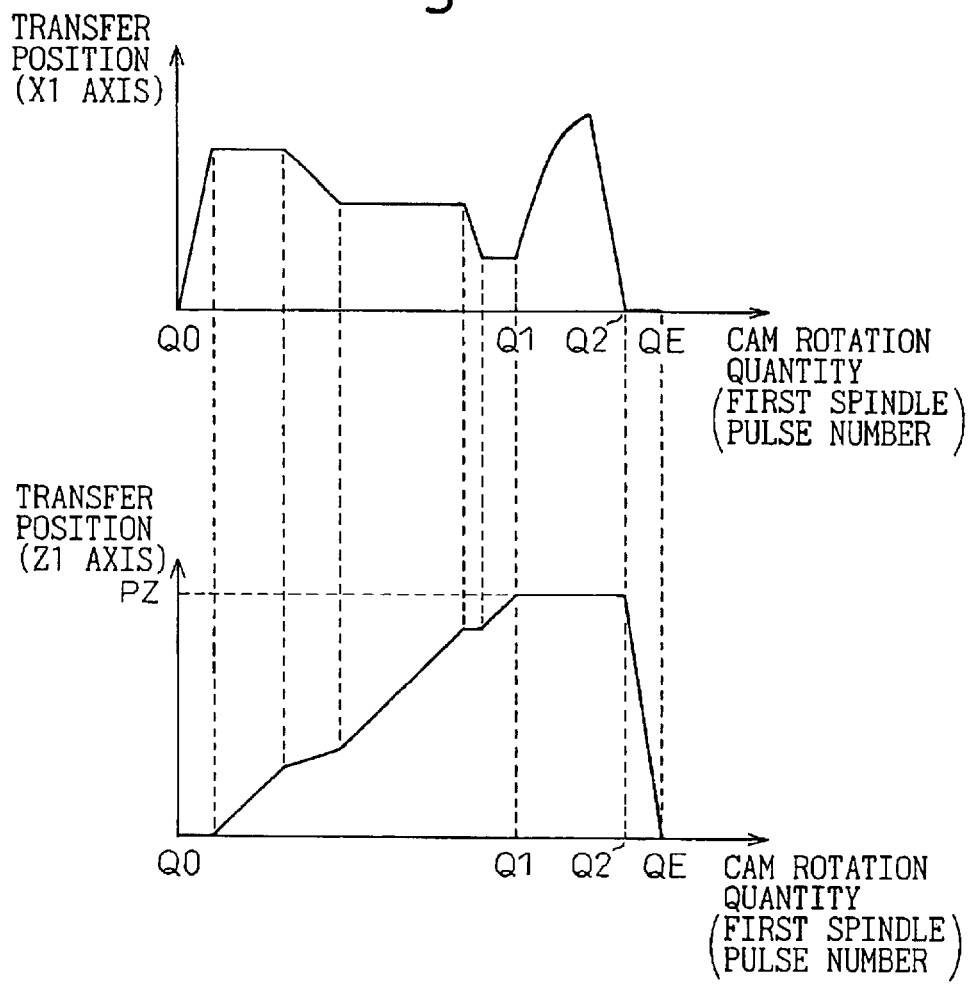
FIG. 11 is a displacement diagram representing cam-reference data for two control axes used in the machining sequence of FIG. 10.

Two displacement diagrams shown in FIG. 11 represent, as different cam diagrams, a cam-reference data for controlling the X1-axis feed motion of the first tool rest 20 and a cam-reference data for controlling the Z1-axis feed motion of the first spindle 16, from a condition where the cutting tool (the turning tool) 24 on the first tool rest 20 performs the outer-diametrical turning process to the bar w securely held in the first spindle 16, to a condition where the tool performs the parting process to the bar W and thereafter is shifted back to the initial position. In these displacement diagrams, the period of the pulse number Q0 to QE corresponds to a cam single rotation and, during this period, the first spindle 16 is in a condition of high-speed rotation.

As seen from two displacement diagrams of FIG. 11, during the period of the pulse number Q0 to Q1, the first spindle 16 and the first tool rest 20 are operated to carry out the feed motions on the respective control axes (Z1-axis and X1-axis) in a synchronized manner on the basis of the cam-reference data. As a result, the cutting tool (the turning tool) 24 is transferred along the tool path TP1 shown in FIG. 10, so as to perform the outer-diametrical turning process to the bar W. Also, during the period of the pulse number Q1 to Q 2, the first spindle 16 is kept at a position PZ while the first tool rest 20 is operated to carry out the X1-axis feed motion on the basis of the cam-reference data. As a result, the cutting tool (the turning tool) 24 performs the parting process to the bar W, and thereafter the first tool rest is shifted back to the initial position. Then, during the period of the pulse number Q2 to QE, the first spindle 16 is operated to carry out the Z1-axis feed motion so as to be shifted back to the initial position, on the basis of the cam-reference data.

Figure 12:
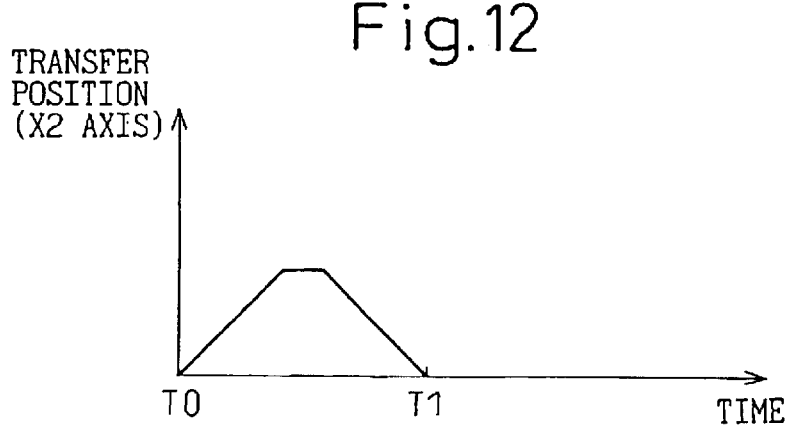
FIG. 12 is a displacement diagram representing time-reference data for one control axis used in the machining sequence of FIG. 10.

The displacement diagram shown in FIG. 12 represents a time-reference data for controlling the X2-axis feed motion of the second tool rest 22, during a condition where the rotary tool 26 on the second tool rest 22 performs the lateral-surface drilling process to the bar W securely held in the first spindle 16 as being halted. As seen from the displacement diagram of FIG. 12, during the period of the time T0 to T1, the second tool rest 22 is operated to carry out the feed motion on the control axis thereof (X2-axis) on the basis of the time-reference data. As a result, the rotary tool 26 is transferred along the tool path TP2 shown in FIG. 10, so as to perform the lateral-surface drilling process to the bar W.

Figure 13:
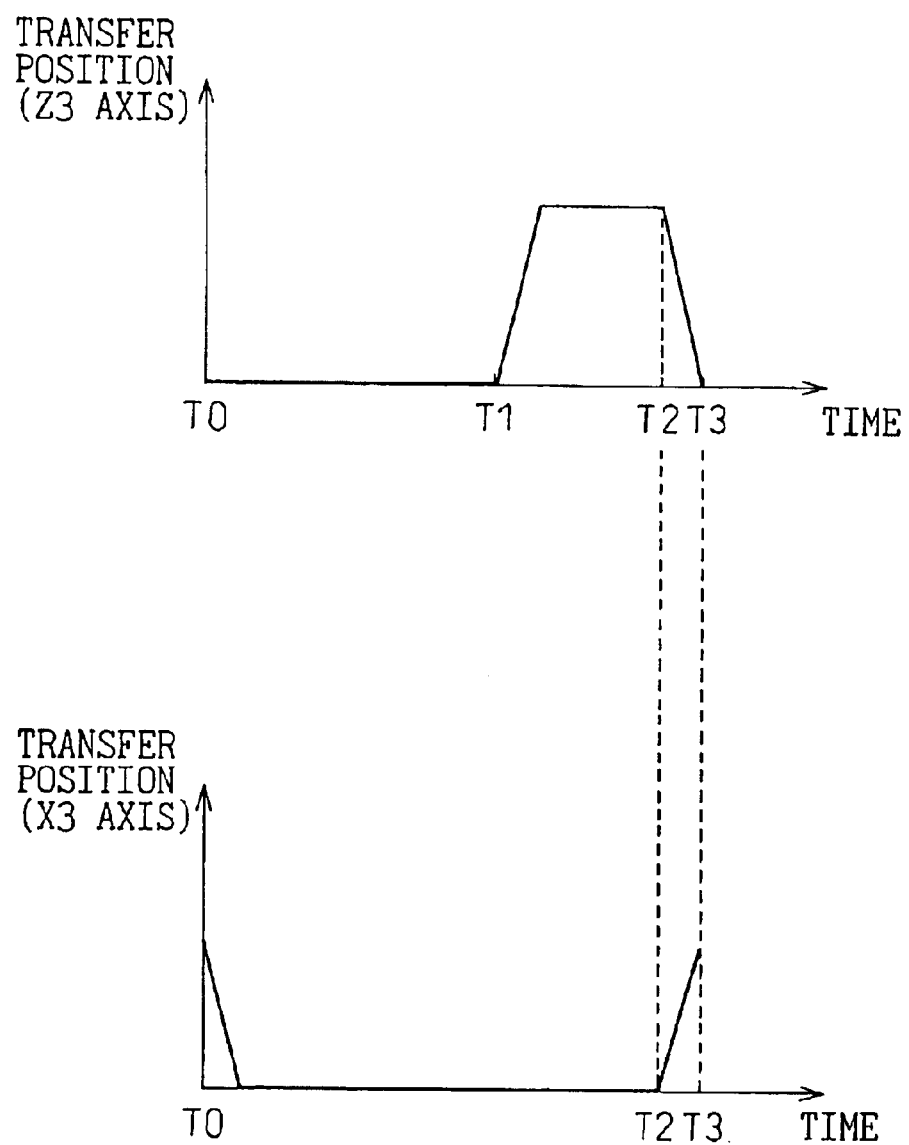
FIG. 13 is a displacement diagram representing time-reference data for the other two control axes used in the machining sequence of FIG. 10.

Two displacement diagrams shown in FIG. 13 represent, as different displacement diagrams, a time-reference data for controlling the Z3-axis feed motion of the second spindle 18 and a time-reference data for controlling the X3-axis feed motion of the second spindle 18, from a condition where the second spindle 18 receives the bar W' from the first spindle 16 after the lateral-surface drilling process is finished, to a condition where the second spindle is transferred into the position oppositely facing the cutting tool (the drill) 24 on the second tool rest 22.

As seen from two displacement diagrams of FIG. 13, during the period of the time T0 to T1, the second spindle 18 is operated to carry out the feed motion on one control axis (X3-axis) while the rotation thereof is halted, so as to be located at a position axially opposite to the first spindle 16 and to be kept at this position, on the basis of the time-reference data. Also, during the period of the time T1 to T2, the second spindle 18 is operated to carry out the feed motion on the other control axis (Z3-axis) in a direction toward the first spindle 16, to securely hold the bar W' by the chuck, and to be kept in this condition, on the basis of the time-reference data. Then, during the period of the time T2 to T3, the second spindle 18 is operated to carry out the feed motion on the X3-axis and the Z3-axis in a synchronized manner, so as to be transferred to the position opposite to the cutting tool (the drill) 24 on the second tool rest 22.

The displacement diagram shown in FIG. 14 represents a time-reference data for controlling the Z2-axis feed motion of the second tool rest 22, during a condition where the cutting tool (the drill) 24 on the second tool rest 22 performs the end-surface drilling process to the bar W' securely held in the second spindle 18 rotating in a high-speed. As seen from the displacement diagram of FIG. 14, during the period of the time T3 to T4, the second tool rest 22 is operated to carry out the feed motion on the control axis thereof (Z2-axis) on the basis of the time-reference data. As a result, the cutting tool (the drill) 24 is transferred along the tool path TP3 shown in FIG. 10, so as to perform the end-surface drilling process to the bar W'.

The displacement diagrams in relation to the respective control axes used in the above-described machining sequence example can be displayed on the display screen in the display section 64 of the control device 12. In this respect, it is possible to designate, for example, on a compound-axis displacement diagram composed from the two displacement diagrams representing the cam-reference data of the first spindle 16 (Z1-axis) and of the first tool rest 20 (X1-axis) shown in FIG. 11, a location where the plural time-reference data of the second spindle 18 (X3-axis, Z3-axis) and of the second tool rest 22 (X2-axis, Z2-axis) shown in FIGS. 12 to 14 interrupt. The location to be interrupted can be directed by a screen picture such as an arrow, or by entering a numerical data, such as a cam rotation angle, the number of pulse or a process number (e.g., a tool number), on the display screen of the display section 64, as already described in association with FIG. 5A.

Figure 15A:
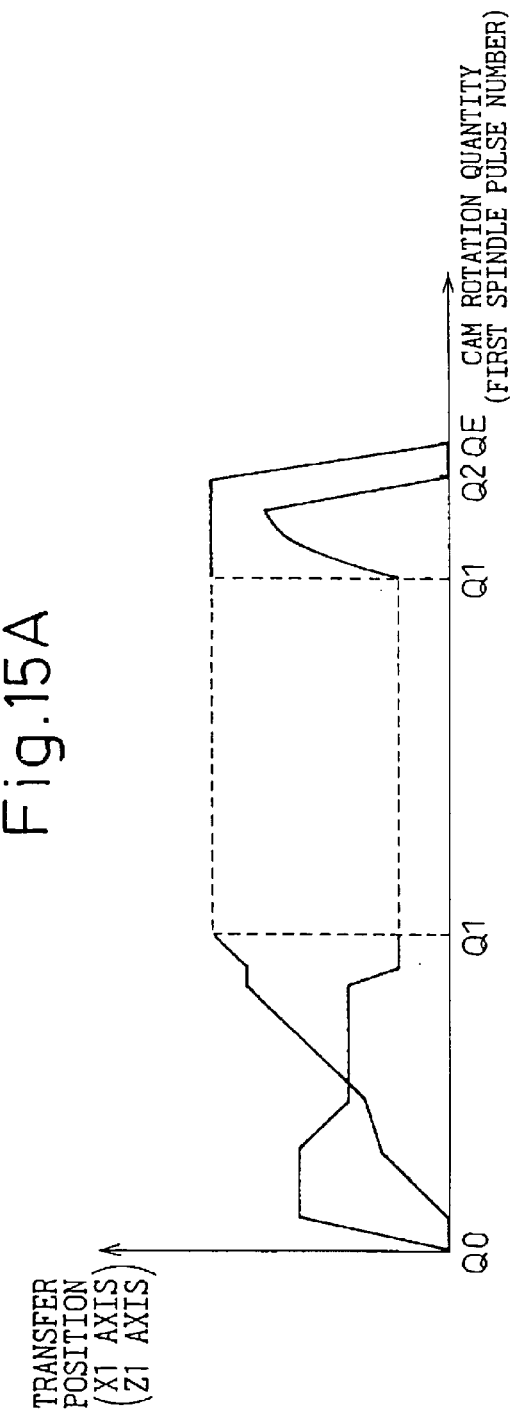
FIG. 15A is a displacement diagram representing the cam-reference data of FIG. 11 in a state after an interruption by the time-reference data thereto is designated.

First, the interruption by the respective displacement diagrams (the time-reference data) shown in FIGS. 12 and 13 is designated at the location of the pulse number Q1 on the compound-axis displacement diagram composed from the respective displacement diagrams (the cam-reference data) shown in FIG. 11. FIG. 15A shows a compound-axis displacement diagram (the cam-reference data) in a state after the interruption is designated, and the respective displacement diagrams are divided at the location of the pulse number Q1. During a halt in the cam-reference process at the pulse number Q1, the displacement diagram (T0 to T1) of FIG. 12 and the respective displacement diagrams (T0 to T2) of FIG. 13 are inserted.

Figure 15B:
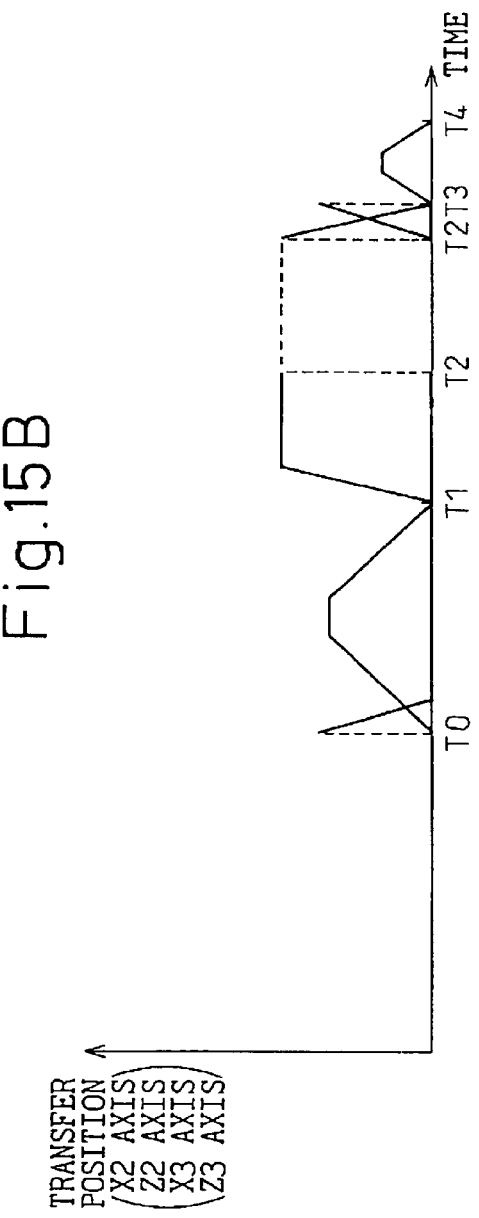
FIG. 15B is a displacement diagram representing the time-reference data of FIGS. 12 to 14 in a state after the interruption is designated.

Furthermore, the interruption by the respective displacement diagrams (the time-reference data) shown in FIGS. 13 and 14 is designated at the location of the pulse number QE (=Q0) on the compound-axis displacement diagram composed from the respective displacement diagrams (the cam-reference data) shown in FIG. 11. During the halt of the cam-reference process at the pulse number QE, the respective displacement diagrams (T2 to T3) of FIG. 13 and the displacement diagram (T0 to T4) of FIG. 14 are inserted. FIG. 15B shows a compound-axis displacement diagram composed from the respective displacement diagrams (the time-reference data) in a state after the interruption is designated, and the respective displacement diagrams are divided at the location of the time T2.

On the basis of the compound-axis displacement diagrams, in each of which the time-series allocation of the cam-reference data and the time-reference data is designated in this manner, the machining sequence example as shown in FIG. 10 is effectively performed as described below.

First, during the pulse numbers Q0 to Q1, the outer-diametrical turning process to the bar W by the cutting tool (the turning tool) 24 on the first tool rest 20 is performed, and just at the pulse number Q1, the feed motions of the first spindle 16 and the first tool rest 20 are halted. Next, during the time T0 to T1, the lateral-surface drilling process to the bar W by the rotary tool 26 on the second tool rest 22 is performed and the preparation of the bar delivery process by the second spindle 18 is operated, as well as, during the time T1 to T2, the second spindle 18 is operated to securely hold the leading end portion of the bar W, while the rotation of the first spindle 16 is halted.

Successively, during a condition where the pulse number advances from Q1 to QE, the cutting tool (the turning tool) 24 on the first toll rest 20 is operated to part the bar W, and thereafter, the first spindle 16 and the first tool rest 20 are shifted to the initial positions, while the first and second spindles 16, 18 rotate at high speed. Next, during the time T2 to T3, the second spindle 18 is arranged to be opposite to the cutting tool (the drill) 24 on the second tool rest 22, and thereafter, during the time T3 to T4, the cutting tool (the drill) 24 on the second tool rest 22 is operated to perform the end-surface drilling process to the bar W'. in this manner, one machining cycle is completed.

Figure 16A:
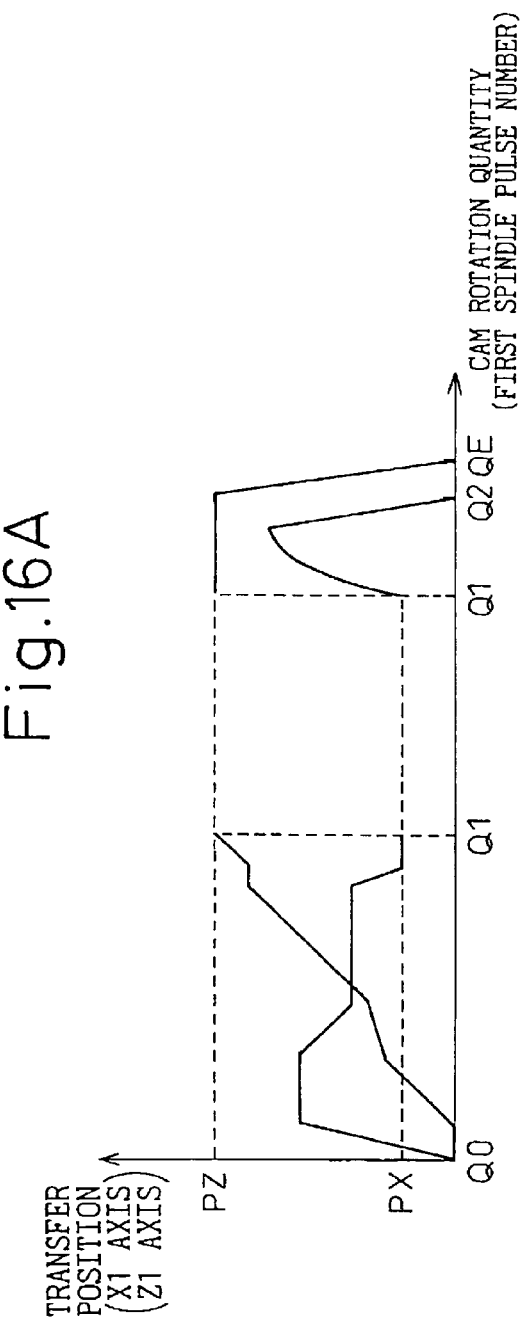
FIG. 16A is a displacement diagram representing the cam-reference data of FIG. 11, in the modification of the machining sequence of FIG. 10, in a state after an interruption by the time-reference data thereto is designated.
Figure 16B:
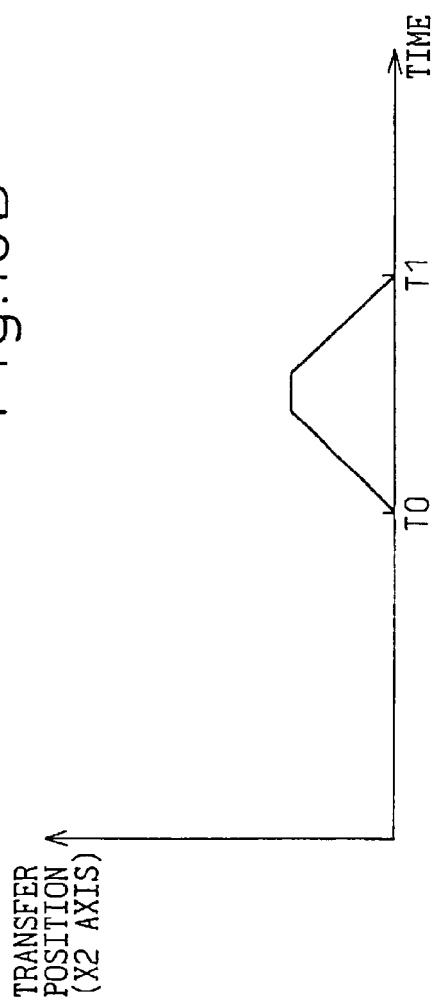
FIG. 16B is a displacement diagram representing the time-reference data of FIG. 12 in a state after the interruption is designated.

It should be noted that, in the above-described example of machining sequence, if the delivering process of the bar W' from the first spindle 16 to the second spindle 18 is not required, the respective-axis displacement diagrams representing a time-series allocation as shown in FIGS. 16A and 16B are obtained.

As will be understood from the above, according to the present invention, it is possible to perform the processes based on the cam-reference data and the processes based on the time-reference data in a properly combined manner. As described in the above machining sequence example, in general, the control based on the cam-reference data is suitable for a turning process accompanied by the rotation of the spindle, while the control based on the time-reference data is suitable for a secondary process not accompanied by the rotation of the spindle. It is also advantageous that, even when the process is accompanied by the spindle rotation, the process such as the C-axis rotation of the first or second spindle 16, 18 or the phase matching thereof is performed under the control based on the time-reference data.

Furthermore, as described in the above machining sequence example, the operation of the bar delivery process with the spindle rotation being halted (but the spindle rotates in the parting process) results in the following advantage. That is, even when a lateral-surface drilling process is performed to the bar at the predetermined C-axis angle or position of the first spindle 16 and thereafter a bar delivery process from the first spindle 16 to the second spindle 18 (including the parting process) is performed, it is possible to easily carry out a lateral-surface drilling process for the second spindle 18 at a predetermined angle or position relative to a previously formed lateral bore under the C-axis control of the second spindle.

While the present invention has been described with reference to the preferred embodiments thereof, it will be understood that the invention is not restricted to those embodiments and that various changes and modifications may be made without departing from the disclosure of the claims.

What is claimed is:

1. A method for controlling an automatically operated lathe provided with at least one spindle and at least one tool rest, comprising:

providing each of a plurality of transfer position data required in a sequence of machining programs in connection with said at least one spindle and said at least one tool rest in a form of either one of two types of transfer position data, one of which is a cam-reference data directing a transfer position as a function of a cam rotation quantity and the other is a time-reference data directing a transfer position as a function of an elapsed time; and processing each of said plurality of transfer position data provided in the form of either one of said cam-reference data and said time-reference data, to control a relative feed motion between said at least one spindle and said at least one tool rest in said sequence of machining programs.

2. A method for controlling, as set forth in claim 1, wherein said at least one spindle and said at least one tool rest are capable of performing a relative feed motion along a plurality of control axes, and wherein the step of providing said transfer position data includes providing each of said plurality of transfer position data in the form of either one of said cam-reference data and said time-reference data in relation to each of said plurality of control axes.

3. A method for controlling, as set forth in claim 1, further comprising a step of designating a time-series allocation of said plurality of transfer position data in said sequence of machining programs, wherein the step of processing said transfer position data includes processing, in accordance with said time-series allocation as designated, each of said plurality of transfer position data provided in the form of either one of said cam-reference data and said time-reference data.

4. A method for controlling, as set forth in claim 1, further comprising a step of showing, in a form of a displacement diagram, each of said plurality of transfer position data provided in the form of either one of said cam-reference data and said time-reference data.

5. A method for controlling, as set forth in claim 4, further comprising a step of designating a time-series allocation of said plurality of transfer position data in said sequence of machining programs on said displacement diagram, wherein the step of processing said transfer position data includes processing, in accordance with said time-series allocation as designated on said displacement diagram, each of said plurality of transfer position data provided in the form of either one of said cam-reference data and said time-reference data.

6. A method for controlling, as set forth in claim 1, wherein the step of processing said transfer position data includes processing, as a function of a pulse number corresponding to said cam rotation quantity, said transfer position directed by said cam-reference data.

7. A method for controlling, as set forth in claim 6, further comprising a step of providing a pulse-train generating source for generating any pulse train, wherein the step of processing said transfer position data includes processing said cam-reference data by using a pulse train generated through said pulse-train generating source.

8. A method for controlling, as set forth in claim 7, wherein said pulse-train generating source generates a pulse train corresponding to a rotation of said at least one spindle.

9. An automatically operated lathe, comprising:

a lathe bed;

at least one spindle mounted on said lathe bed;

at least one tool rest mounted on said lathe bed;

a control device for controlling an operation of said at least one spindle and said at least one tool rest on said lathe bed;

said control device including:

an input section permitting an entering of each of a plurality of transfer position data required in a sequence of machining programs in connection with said at least one spindle and said at least one tool rest in a form of either one of two types of transfer position data, one of which is a cam-reference data directing a transfer position as a function of a cam rotation quantity and the other is a time-reference data directing a transfer position as a function of an elapsed time; and a processing section processing each of said plurality of transfer position data entered through said input section in the form of either one of said cam-reference data and said time-reference data, to thereby generate a control signal for controlling a relative feed motion between said at least one spindle and said at least one tool rest in said sequence of machining programs.

10. An automatically operated lathe as set forth in claim 9, wherein said at least one spindle and said at least one tool rest are capable of performing a relative feed motion along a plurality of control axes on said lathe bed, and wherein said input section of said control device permits an entering of each of said plurality of transfer position data in the form of either one of said cam-reference data and said time-reference data in relation to each of said plurality of control axes.

11. An automatically operated lathe as set forth in claim 9, wherein said input section of said control device permits an designation of a time-series allocation of said plurality of transfer position data in said sequence of machining programs, and wherein said processing section of said control device processes, in accordance with said time-series allocation designated through said input section, each of said plurality of transfer position data entered in the form of either one of said cam-reference data and said time-reference data through said input section.

12. An automatically operated lathe as set forth in claim 9, wherein said control device further includes a display section displaying, in a form of a displacement diagram, each of said plurality of transfer position data entered through said input section in the form of either one of said cam-reference data and said time-reference data.

13. An automatically operated lathe as set forth in claim 12, wherein said input section of said control device permits a designation of a time-series allocation of said plurality of transfer position data in said sequence of machining programs on said displacement diagram displayed in said display section, and wherein said processing section of said control device processes, in accordance with said time-series allocation as designated on said displacement diagram, each of said plurality of transfer position data entered in the form of either one of said cam-reference data and said time-reference data through said input section.

14. An automatically operated lathe as set forth in claim 9, wherein said processing section of said control device processes, as a function of a pulse number corresponding to said cam rotation quantity, said transfer position directed by said cam-reference data entered through said input section.

15. An automatically operated lathe as set forth in claim 14, further comprising a pulse-train generating source for generating any pulse train, wherein said processing section of said control device processes said cam-reference data by using a pulse train generated through said pulse-train generating source.

16. An automatically operated lathe as set forth in claim 15, wherein said pulse-train generating source generates a pulse train corresponding to a rotation of said at least one spindle.

17. A control device for use in an automatically operated lathe provided with at least one spindle and at least one tool rest, comprising:

an input section permitting an entering of each of a plurality of transfer position data required in a sequence of machining programs in connection with said at least one spindle and said at least one tool rest in a form of either one of two types of transfer position data, one of which is a cam-reference data directing a transfer position as a function of a cam rotation quantity and the other is a time-reference data directing a transfer position as a function of an elapsed time; and a processing section processing each of said plurality of transfer position data entered through said input section in the form of either one of said cam-reference data and said time-reference data, to thereby generate a control signal for controlling a relative feed motion between said at least one spindle and said at least one tool rest in said sequence of machining programs.

18. A control device as set forth in claim 17, wherein said input section permits an designation of a time-series allocation of said plurality of transfer position data in said sequence of machining programs, and wherein said processing section processes, in accordance with said time-series allocation designated through said input section, each of said plurality of transfer position data entered in the form of either one of said cam-reference data and said time-reference data through said input section.

19. A control device as set forth in claim 17, further comprising a display section displaying, in a form of a displacement diagram, each of said plurality of transfer position data entered through said input section in the form of either one of said cam-reference data and said time-reference data.

20. A control device as set forth in claim 19, wherein said input section permits a designation of a time-series allocation of said plurality of transfer position data in said sequence of machining programs on said displacement diagram displayed in said display section, and wherein said processing section processes, in accordance with said time-series allocation as designated on said displacement diagram, each of said plurality of transfer position data entered in the form of either one of said cam-reference data and said time-reference data through said input section.

21. A control device as set forth in claim 17, wherein said processing section processes, as a function of a pulse number corresponding to said cam rotation quantity, said transfer position directed by said cam-reference data entered through said input section.

* * * * *